(12) United States Patent
Henry

(10) Patent No.: US 7,172,207 B2
(45) Date of Patent: Feb. 6, 2007

(54) COLLAPSIBLE CART

(76) Inventor: Terry Henry, 455 Bender Rd., Roundup, MT (US) 59072

( * ) Notice: Subject to any disclaimer, the term of this patent is extended or adjusted under 35 U.S.C. 154(b) by 0 days.

(21) Appl. No.: 11/142,134

(22) Filed: Jun. 1, 2005

(65) Prior Publication Data

US 2006/0273554 A1 Dec. 7, 2006

(51) Int. Cl.
B62B 1/00 (2006.01)

(52) U.S. Cl. .............. 280/651; 280/652; 280/47.33; 280/40

(58) Field of Classification Search .......... 280/47.3, 280/47.2, 47.33, 40, 47.24, 645, 655, 652, 280/659, 639, 651
See application file for complete search history.

(56) References Cited

U.S. PATENT DOCUMENTS

| | | | |
|---|---|---|---|
| 2,775,465 A | * | 12/1956 | Swingler ............ 280/47.2 |
| 4,063,744 A | | 12/1977 | Fraser |
| 5,330,212 A | * | 7/1994 | Gardner ............ 280/40 |
| 5,673,928 A | | 10/1997 | Jury |
| 5,853,189 A | | 12/1998 | Swartzlander |
| 5,887,879 A | | 3/1999 | Chumley |
| 6,217,043 B1 | | 4/2001 | Chumley |
| 6,283,496 B1 | | 9/2001 | Dickmann |
| 6,308,968 B1 | | 10/2001 | Hollingsworth |
| 6,361,063 B1 | | 3/2002 | Daeschner |
| 6,561,592 B1 | | 5/2003 | Guhr |
| 6,688,635 B1 | | 2/2004 | Watts |
| 6,811,179 B2 | | 11/2004 | Woods |
| 7,032,921 B2 | * | 4/2006 | Swanner ............ 280/645 |
| 2002/0041084 A1 | | 4/2002 | Darling, III |
| 2003/0080538 A1 | | 5/2003 | Watts et al. |
| 2003/0205885 A1 | | 11/2003 | Woods |
| 2003/0209886 A1 | | 11/2003 | Darling, III |
| 2004/0080128 A1 | | 4/2004 | Lindsey et al. |
| 2004/0155435 A1 | | 8/2004 | Watts |
| 2004/0222617 A1 | | 11/2004 | Darling, III |

* cited by examiner

*Primary Examiner*—Hau Phan
(74) *Attorney, Agent, or Firm*—Antoinette M. Tease

(57) ABSTRACT

A collapsible cart comprising two elongate handle bars, four vertical telescoping bars, two main vertical supports, two horizontal cross-bars, two anchor blocks, four diagonal pivoting support bars, and two wheel assemblies, wherein each telescoping bar is fixedly attached at one end to a horizontal cross-bar and rotatably attached at the other end to a handle bar, wherein each vertical support is attached at one end to an anchor block, wherein each handle bar slides up and down on a vertical support, wherein each horizontal cross-bar is attached at one end to a telescoping bar and at the other end to another telescoping bar, wherein each diagonal pivoting support bar is rotatably attached at one end to the horizontal cross-bar on one side of the cart and at the other end to the handle bar on the other side of the cart.

20 Claims, 31 Drawing Sheets

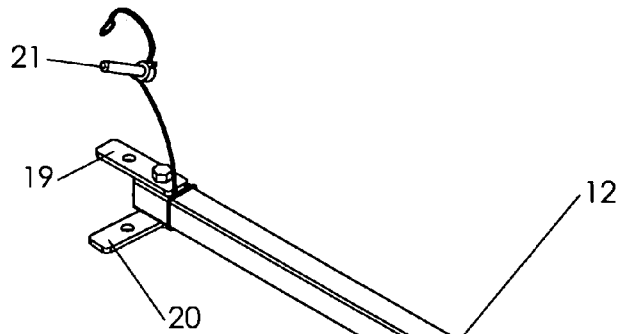
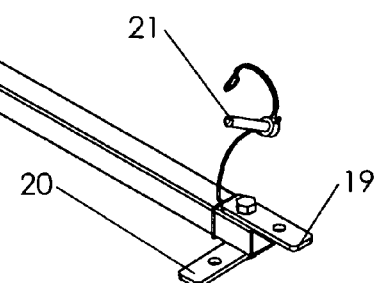
FIGURE 6
FIGURE 7
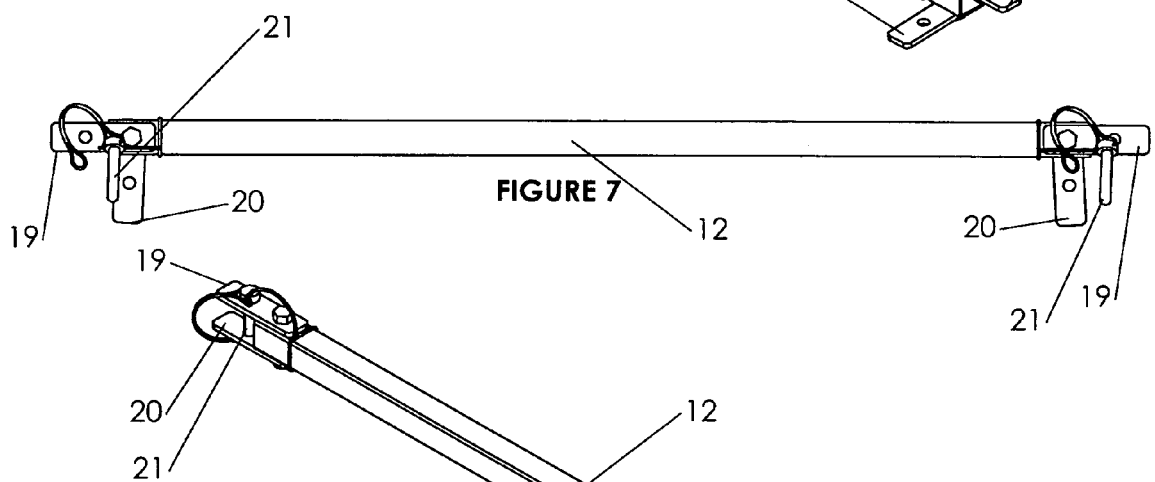
FIGURE 8
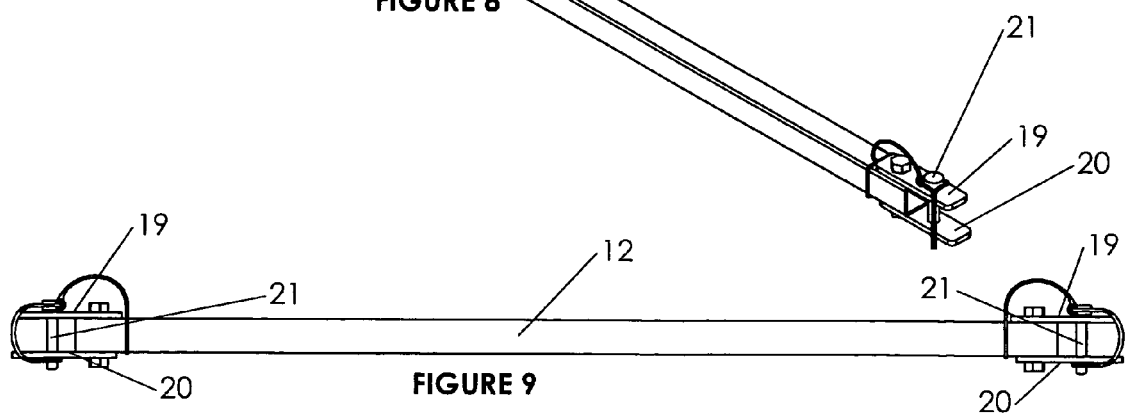
FIGURE 9

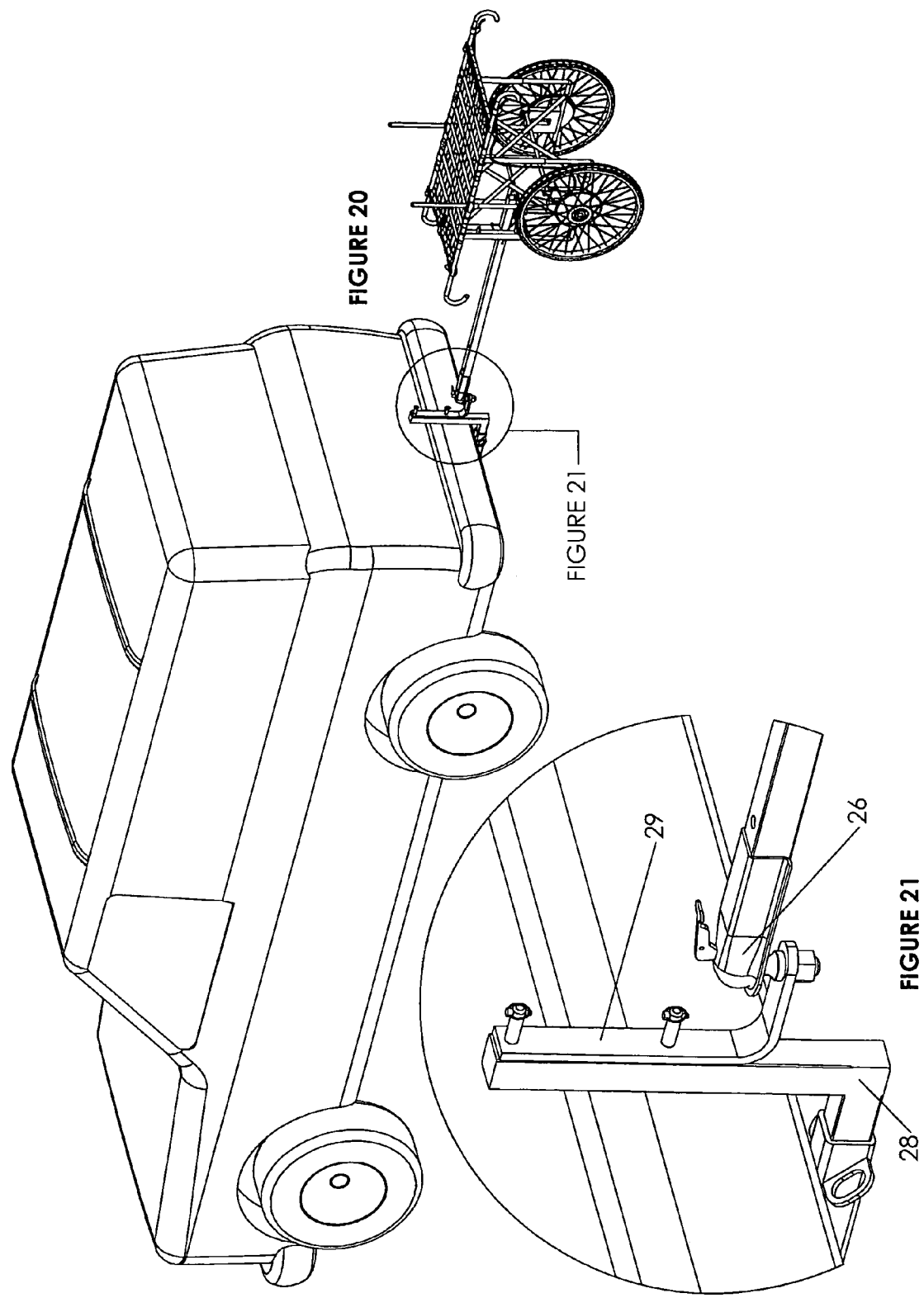

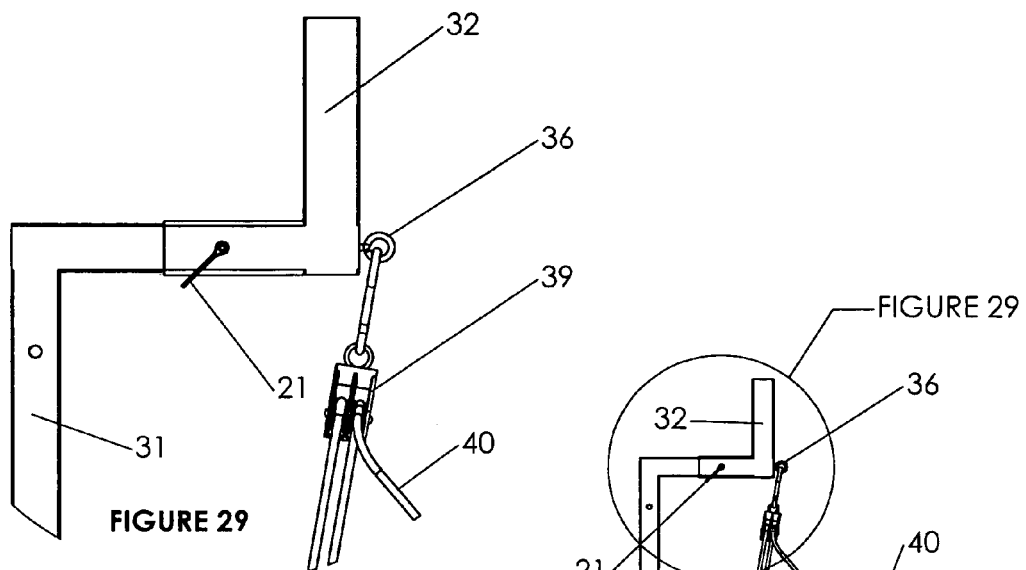
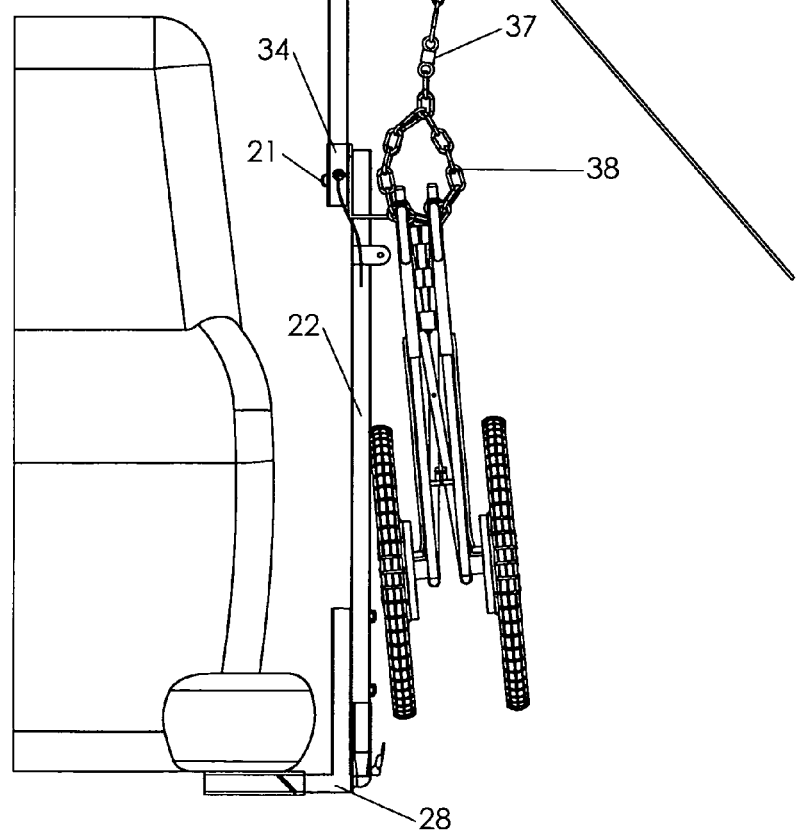
FIGURE 29
FIGURE 28

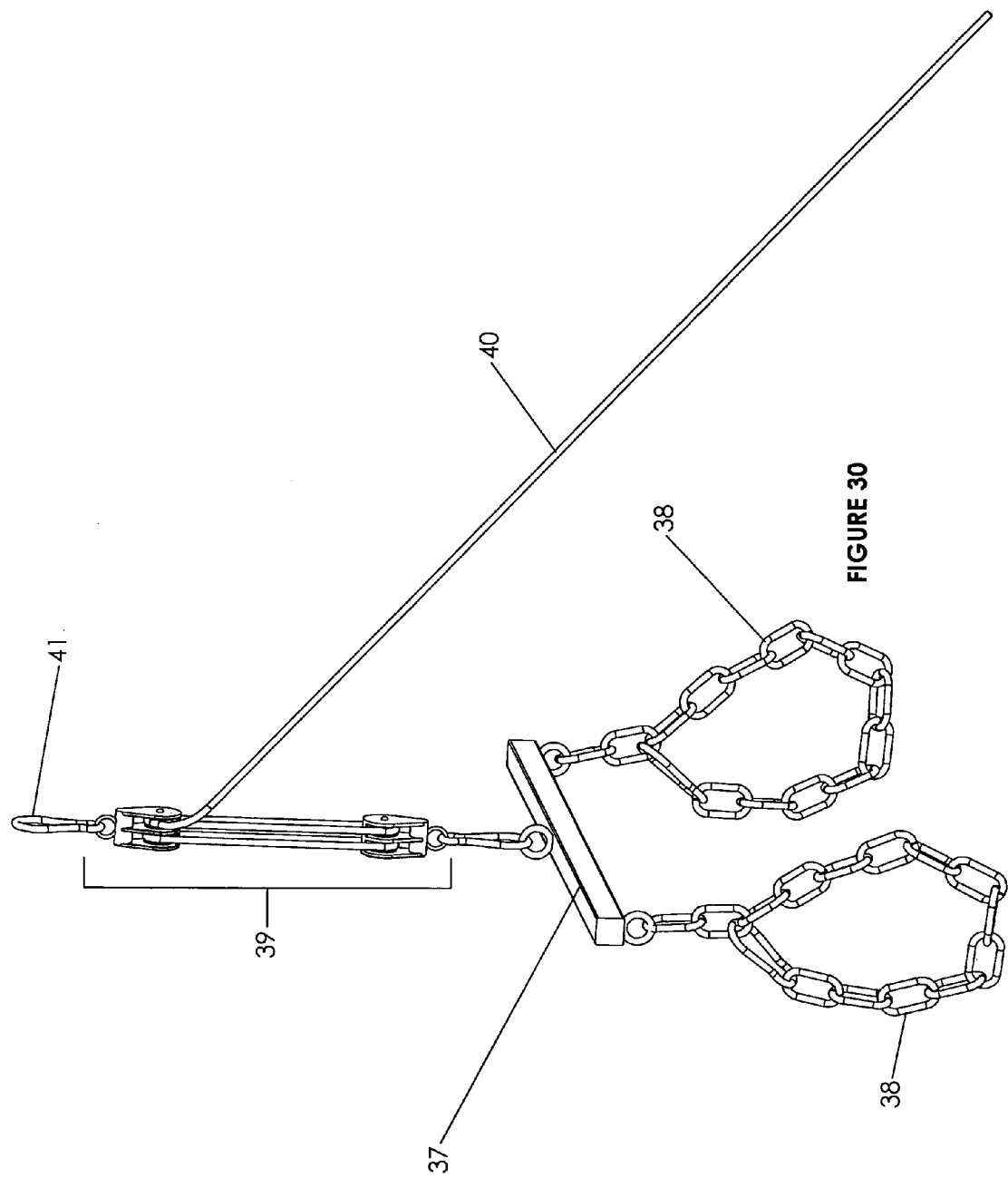

COLLAPSIBLE CART

BACKGROUND OF THE INVENTION

1. Field of the Invention

The present invention relates to the field of hand-operated and motor-operated carts, and more specifically, to a collapsible cart that can be used to carry game or for search and rescue purposes.

2. Description of the Related Art

There are a number of issued patents and published patent applications relating to collapsible and/or portable carts, none of which possesses the unique features of the present invention. For example, U.S. Pat. No. 6,688,635 (Watts, 2004) and U.S. Patent Application Pub. Nos. 2003/0080538 and 2004/0155435 (Watts) cover a hand-operated utility cart for use in deer hunting. Although this cart breaks down for storage and transportation purposes, it is not collapsible.

U.S. Pat. No. 6,361,063 (Daeschner, 2002) discloses an apparatus for the portage of cargo. This apparatus has only one wheel and is significantly less stable than the cart of the present invention. It could not be used to carry heavy loads such as an elk carcass or an injured human being.

U.S. Pat. No. 4,063,744 (Fraser, 1977) provides a collapsible camp pack and game carrier, but again, this cart has only one wheel, which presents certain limitations not present in the present invention.

U.S. Pat. No. 6,811,179 (Woods, 2004) and U.S. Patent Application Pub. No. 2003/0205885 (Woods) relate to a cart with two wheels, but the wheels are on the same plane, which makes the cart inherently less stable than the cart of the present invention.

U.S. Pat. No. 5,853,189 (Swartzlander, 1998) presents a cart with an upper deck that is rigid and immobile. By contrast, the upper carrying surface of the cart of the present invention is non-rigid and collapses with the cart. In addition, although the cart covered by the '189 patent collapses, it does not collapse front side to side, as does the cart of the present invention. Instead, the Swartzlander cart collapses from the top down.

U.S. Pat. No. 5,673,928 (Jury, 1997) covers a foldable and portable hand-propelled cart for use in transporting game. A portion of the frame is hinged, the wheels are releasably attached to the axle assemblies, and the axle assemblies are pivotally attached to the frame so that the cart can be folded and transported on the back of a user like a backpack. This cart, although lightweight and portable, was not designed for carrying heavy game or persons.

U.S. Pat. No. 6,308,968 (Hollingsworth, 2001) discloses a collapsible hunting apparatus in which the wheels are rotatably mounted to elongate arms. The frame itself is immovable and does not collapse, although the elongate arms can be extended and retracted, and the wheels can be swung up onto the frame for transport and storage.

U.S. Pat. No. 6,217,043 (Chumley, 2001) and U.S. Pat. No. 5,887,879 (Chumley, 1999) provide a portable and somewhat collapsible cart in which the wheels can be rotated up onto the top of the frame, and the handle can be telescoped inwardly into the frame. The cart does not collapse from side to side, however, as in the present invention.

U.S. Pat. No. 6,561,529 (Darling, III, 2003) and U.S. Patent Applications Pub. Nos. 2002/0041084, 2003/0209886 and 2004/0222617 (Darling, III) relate to a collapsible and portable cart that can be worn on the user's back. Although the cart includes straps for holding cargo, a separate carry frame has to be attached to the cart in order to carry game. In addition, to collapse the cart, it has to be physically taken apart, whereas the cart of the present invention can be collapsed in one simple motion.

U.S. Pat. No. 6,283,496 (Dickmann, 2001) presents a collapsible game hauling carrier. The carrier does not include a flexible cargo bed, and the mechanism for collapsing the cart is more complicated than that of the present invention. Instead of collapsing with the wheels on opposite sides of the cargo bed (as they would be in operation), the wheels are positioned on top of one another when the cart is in a collapsed state.

U.S. Patent Application Pub. No. 2004/0080123 (Lindsey et al.) covers a hand-operated vehicle that converts into a hand-towed cart, a hand truck, a hitchable trailer, a bicycle rack, a bed and a chair. The vehicle was designed primarily for hunters. The main frame of the cart is not collapsible, however.

Accordingly, it is an object of the present invention to provide a collapsible cart that can be used for hunting or search and rescue purposes. It is a further object of the present invention to provide a cart that is relatively easy to deploy, fold and store in cold weather or under similarly adverse conditions. It is a further object of the present invention to provide a collapsible cart that is convertible into a trailer. It is a further object of the present invention to provide a storage rack for the collapsible cart so that it can be stored on the back of a vehicle.

BRIEF SUMMARY OF THE INVENTION

The present invention is a collapsible cart comprising two elongate handle bars, four vertical telescoping bars, two main vertical supports, two horizontal cross-bars, two anchor blocks, four diagonal pivoting support bars, and two wheel assemblies, wherein each vertical telescoping bar is fixedly attached at one end to one of the horizontal cross-bars and at the other end to one of the elongate handle bars, wherein the vertical telescoping bars rotate at the point at which they attach to the elongate handle bars, wherein each main vertical support is attached at one end to one of the anchor blocks, wherein each elongate handle bar slides up and down on one of the main vertical supports, wherein each horizontal cross-bar is attached at one end to one of the four vertical telescoping bars and at the other end to another of the four vertical telescoping bars, wherein each diagonal pivoting support bar is attached at one end to the horizontal cross-bar on one side of the cart and at the other end to the elongate handle bar on the other side of the cart, and wherein the diagonal pivoting support bars rotate at the points at which they attach to the horizontal cross-bars and elongate handle bars. Each anchor block is preferably support by a horizontal cross-bar, and the four diagonal pivoting support bars are attached to each other in pairs at a pivot point so that each pair of diagonal pivoting support bars form an "X."

The collapsible cart of the present invention further comprises two handle support arms, wherein the handle support arms are removable, and wherein each handle support arm connects one of the elongate handle bars to the other. The collapsible cart further comprises a carrying platform, wherein the carrying platform is attached to the elongate handle bars when the cart is in a collapsed position and to the elongate handle bars and the handle support bars when the cart is in a non-collapsed position, and wherein the carrying platform is comprised of a flexible material. The collapsible cart further comprises a main horizontal connector, wherein the main horizontal connector is removable, and wherein the main horizontal connector is attached at one end to one of the anchor blocks and at the other end to the other anchor block.

In one embodiment, the collapsible cart of the present invention further comprises a manual brake, and each wheel assembly comprises a wheel, an axle and a brake drum. The wheels are preferably motorcycle wheels.

In yet another embodiment, the collapsible cart of the present invention can be converted into a trailer. In this embodiment, the collapsible cart further comprises a tongue, a brace and a locking bracket, wherein the tongue comprises two lateral wings, two transport arms, and a trailer hitch, wherein each vertical telescoping bar comprises an upper portion and a lower portion, where each lateral wing of the tongue is attached to the lower portion of one of the vertical telescoping bars, and wherein the brace is attached to the tongue on one end and secured to one of the handle support arms on the other end.

The present invention also encompasses a transport mechanism that allows the cart to be transported on the back of a vehicle. In this embodiment, the collapsible cart further comprises a tongue, a receiver, a loading bar, and a corner piece, wherein the receiver is attached to a vehicle, wherein the tongue is attached to the receiver, wherein the tongue comprises a transport sleeve, wherein loading bar slides through the transport sleeve; wherein the tongue comprises transport arms, wherein the transport arms hold the cart when it is in a collapsed position, wherein the loading bar comprises a front end, and wherein the corner piece attaches to the front end of the loading bar. In one embodiment, the transport arms comprise tabs, which keep the cart from falling off when it is loaded onto the transport arms.

The present invention also encompasses a hoist mechanism that makes it easier for the user to lift the collapsible cart off of the transport mechanism. In this embodiment, the collapsible cart further comprises a hoist mechanism, wherein the hoist mechanism comprises a horizontal bar, two chains, and a pulley system, wherein the corner piece comprises an eyelet, wherein the pulley system is attached to the eyelet, wherein the loading bar is pushed upward through the transport sleeve and locked in place, wherein each chain is secured to one end of the elongate handle bars, wherein the pulley system comprises a rope, and wherein the cart is lifted off the transport arms by pulling on the rope.

The present invention includes a motorized version of the collapsible cart. In this embodiment, the collapsible cart further comprises a motor drive assembly, wherein the motor drive assembly comprises a motor, a battery, a drive shaft, two drive sprockets, two driven wheel sprockets, and two drive chains, wherein the motor drives the drive shaft, wherein the drive shaft turns the drive sprockets, wherein the drive sprockets drive the drive chains, wherein the drive chains drive the driven wheel sprockets, and wherein the driven wheel sprockets cause the wheels to turn. The motor drive assembly further comprises a motor support platform, a battery support platform, and two support blocks, wherein the motor is supported by the motor support platform, wherein the motor support platform is supported by the anchor blocks, wherein the battery is supported by the battery support platform, wherein the battery support platform is supported by the support blocks, and wherein the support blocks are situated between the motor support platform and the battery support platform. In the motorized embodiment, the collapsible cart further comprises a speed control lever and a speed control wire, wherein the speed control lever is attached to one of the elongate handle bars, and wherein the speed control wire connects the speed control lever to the motor.

BRIEF DESCRIPTION OF THE DRAWINGS

FIG. 6 is a perspective view of a handle support arm with the pivoting extension perpendicular to the rest of the support bar.

FIG. 7 is a top view of a handle support arm with the pivoting extension perpendicular to the rest of the support bar.

FIG. 8 is a perspective view of a handle support arm with the pivoting extension parallel to the rest of the support bar.

FIG. 9 is a side view of a handle support arm with the pivoting extension parallel to the rest of the support bar.

FIG. 20 is a perspective view of the trailer embodiment of the cart attached to a vehicle.

FIG. 21 is a partial perspective view of the trailer embodiment of the cart taken at the circle shown in FIG. 20.

FIG. 28 is a side view of the transport and hoist mechanisms and a side perspective view of the cart mounted on a vehicle.

FIG. 29 is a side view of the corner piece when it is in hoist position.

FIG. 30 is a perspective view of the hoist system of the present invention.

REFERENCE NUMBERS

Figure 1:
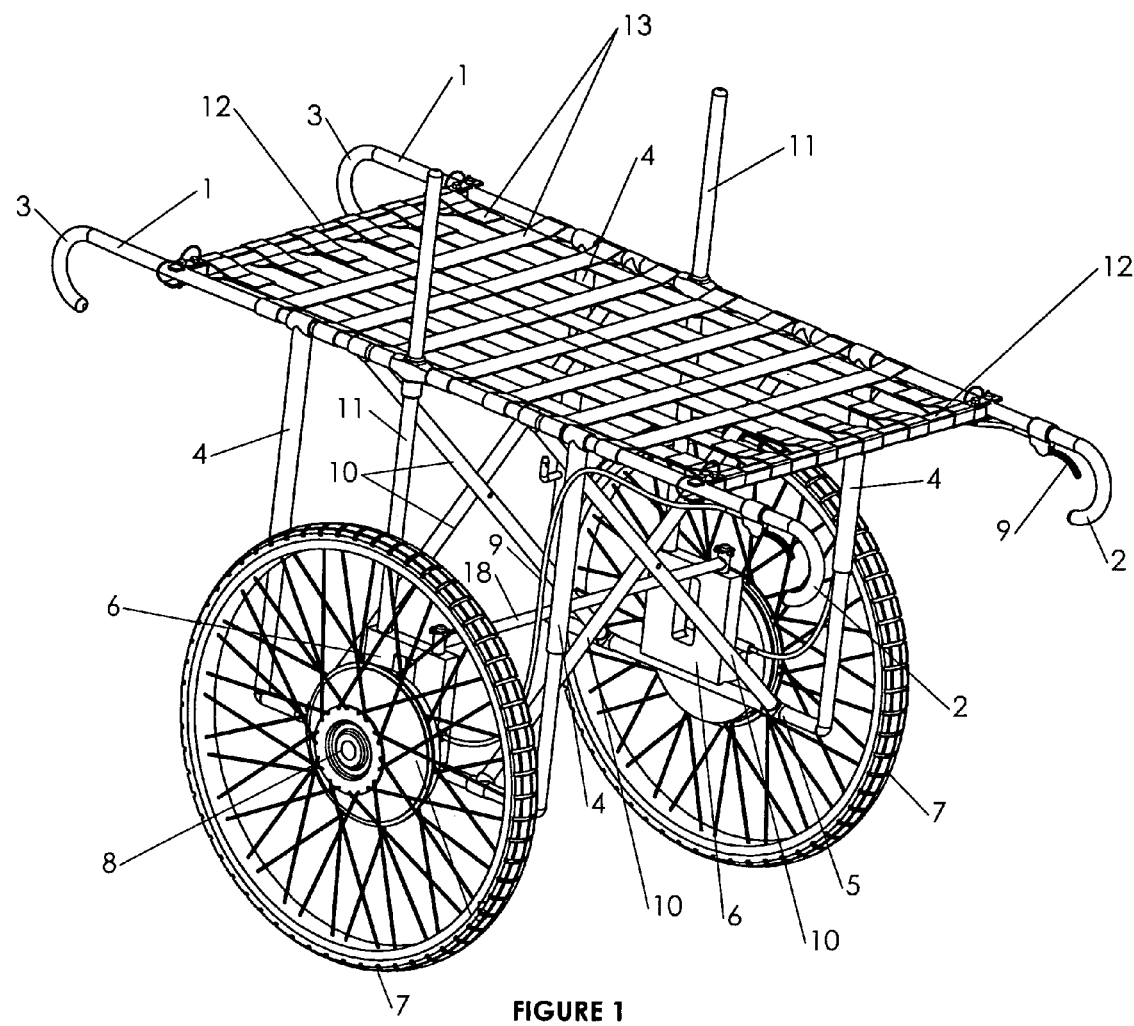
FIG. 1 is a front perspective view of the cart of the present invention in an operational position.

1 Elongate handle bar
2 First end of elongate handle bar
3 Second end of elongate handle bar
4 Vertical telescoping bar
5 Horizontal cross-bar
6 Anchor block
7 Wheel
8 Axle
9 Manual brake
10 Diagonal pivoting support bar
11 Main vertical support
12 Handle support arm
13 Flexible webbing
14 Pivot point (between diagonal pivoting support bars)
15 Brake drum
16 Tongue mount extension
17 Vertical main horizontal connector extension
18 Main horizontal connector
19 Fixed extension (of handle support arm)
20 Pivoting extension (of handle support arm)
21 Lynch pin
22 Tongue
23 Brace
24 Locking bracket
25 Lateral wings (of tongue)
26 Trailer hitch
27 Transport arms
28 Receiver
29 Trailer ball attachment
30 Apertures
31 Loading bar
32 Corner piece
33 Peg
34 Transport sleeve
35 Transport safety tabs
36 Eyelet
37 Horizontal bar
38 Chains
39 Pulley system
40 Rope
41 Hook
42 Speed control lever
43 Drive sprocket
44 Driven wheel sprocket
45 Drive chain
46 Speed control wire
47 Motor support platform
48 Drive shaft
49 Battery
50 Motor
51 Battery support platform
52 Support block
53 Ledge (of motor support platform)
54 Bungee cord

DETAILED DESCRIPTION OF INVENTION

FIG. 1 is a front perspective view of the cart of the present invention in an operational position. As shown in FIG. 1, the cart of the present invention comprises two elongate handle bars 1, each of which comprises a first end 2 and a second end 3. The elongate handle bars 1 are supported by four vertical telescoping bars 4. Each vertical telescoping bar 4 comprises an upper portion and a lower portion, and the lower portion of each vertical telescoping bar telescopes inside the upper portion (i.e., the total length of the vertical telescoping bar can be increased or decreased by extending or retracting the lower portion within the upper portion). The vertical telescopiong bars 4 are each connected to a horizontal cross-bar 5, which connects the vertical telescoping bars 4 to an anchor block 6 on the inside of each wheel assembly. There is one wheel assembly on each side of the cart. Each wheel assembly comprises a wheel 7, axle 8 and brake drum (not shown). In the preferred embodiment, the wheels are standard motorcycle wheels. Although the present invention is not limited to any particular type of wheel, it was determined that bicycle wheels do not provide sufficient durability for carrying heavy loads in rugged terrain. Optionally, the first end of each elongate handle bar 2 is equipped with a manual brake 9.

The cart further comprises four diagonal pivoting support bars 10, each of which is attached on one end to one of the two horizontal cross-bars 5 and on the other end to the handle bar 1 on the opposite side of the cart. The diagonal pivoting support bars 10 are pivotally attached to each other in pairs, with one pair on the front side of the cart inside the vertical telescoping bars 4 and one pair on the rear side of the cart inside the vertical telescoping bars 4. This pivot point is shown more clearly in FIG. 2. The diagonal pivoting support bars also rotate at the points at which they join the horizontal cross-bar 5 and the handle bar 1. These rotation points are necessary to enable the cart to collapse.

In addition, the cart comprises two main vertical supports 11, which are connected on one end to the anchor block 6. The handle bars 1 slide up and down on the main vertical supports 11, which is another feature that enables the cart to collapse. The handle bars 1 are separated by a pair of handle support arms 12, which are removable and which serve to maintain a fixed distance between the handle bars 1 when the cart is in an operational position. A flexible webbing 13, which forms the carrying platform, is attached to both the handle bars 1 and the handle support arms 12. In the preferred embodiment, a nylon webbing is used, but any material that provides the requisite durability and flexibility would suffice. In fact, the carrying platform could be made of a solid sheet of material as opposed to webbing, or it could be made of mesh or any other suitable material.

Figure 2:
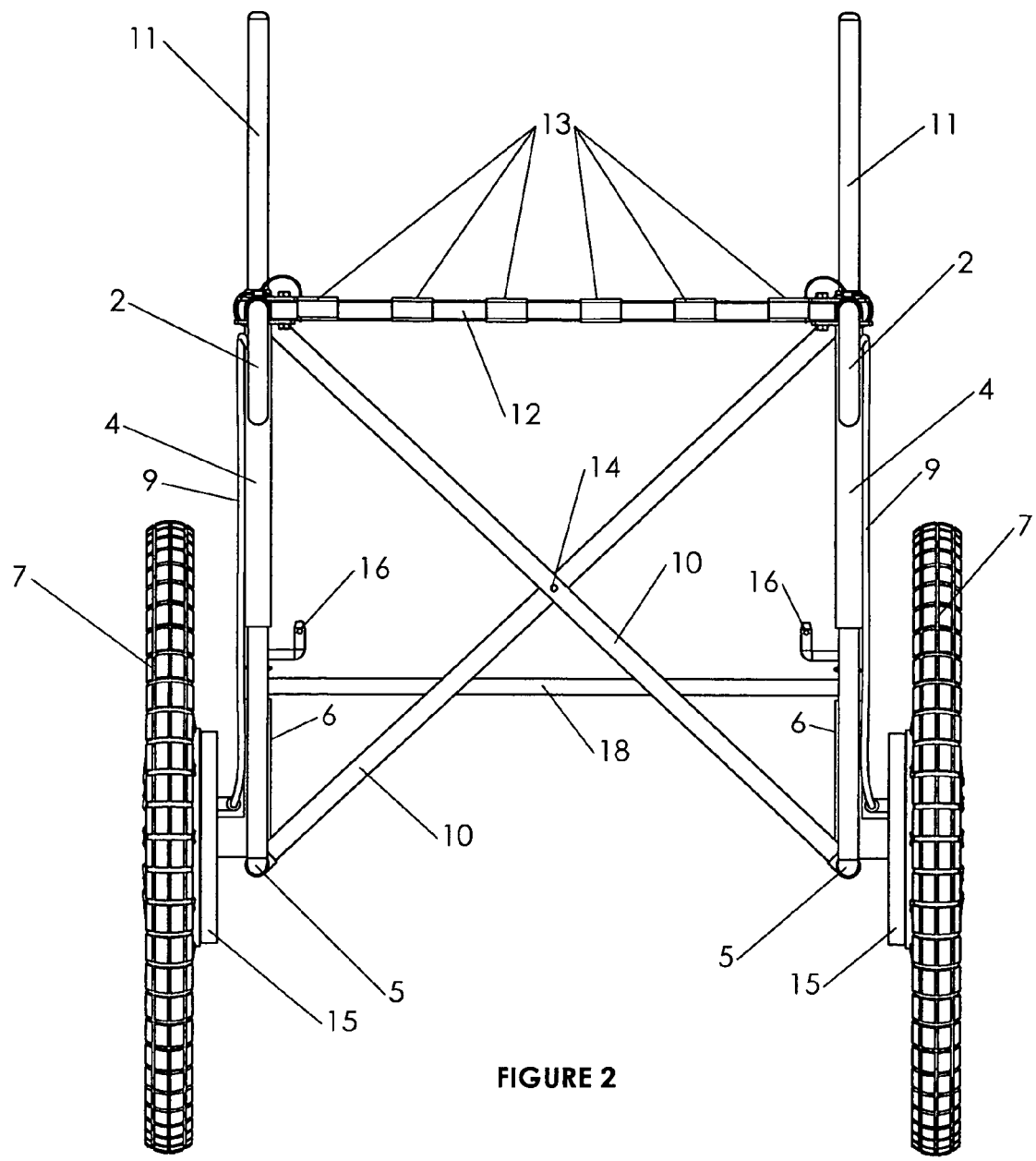
FIG. 2 is a front view of the cart of the present invention in an operational position.

FIG. 2 is a front view of the cart of the present invention in an operational position. This figure shows the first end of the handle bars 2, two of the vertical telescoping bars 4, the end of the two horizontal cross-bars 5, the anchor blocks 6, and the wheels 7. It also shows the two diagonal pivoting support bars 10 on the front end of the cart, as well as the pivot point 14 between the two diagonal pivoting support bars 10. The manual brakes 9, brake drums 15, main vertical supports 11, handle support arm 12, and flexible webbing 13 are also shown, as are the two tongue mount extensions 16, which are used to convert the cart into a trailer. The tongue mount extensions 16 are attached to the lower portion of each of the two vertical telescoping bars 4 on the rear side of the cart. As shown more fully in FIG. 3A, the main horizontal connector 18 attaches on either end to a vertical main horizontal connector extension 17 that extends upward from each anchor block 6.

Figure 3:
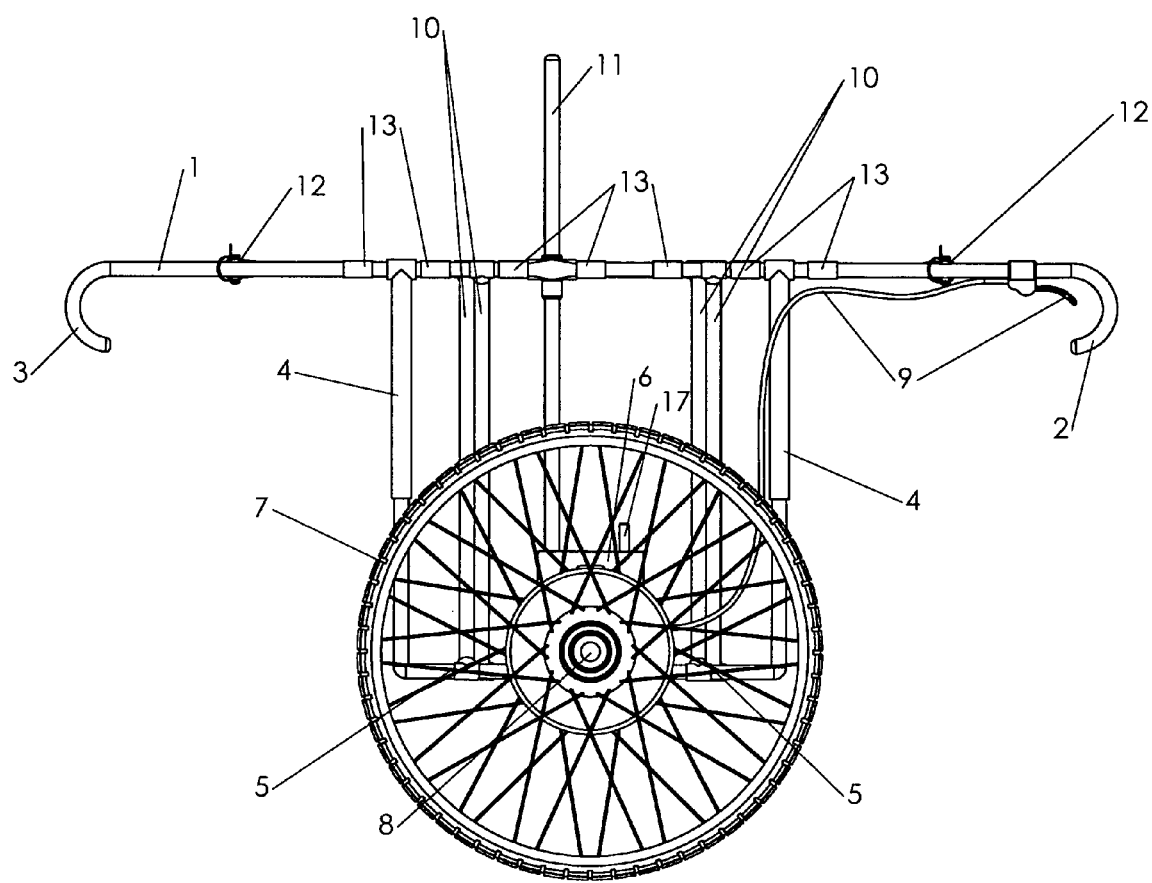
FIG. 3 is a side view of the cart of the present invention in an operational position.

FIG. 3 is a side view of the cart of the present invention in an operational position. This figure shows the first 2 and second 3 ends of the elongate handle bars 1, two of the four vertical telescoping bars 4, one of the two horizontal cross-bars 5, one of the two anchor blocks 6, one of the two wheels 7, and one of the two axles 8. It also shows one of the two manual brakes 9, all four diagonal pivoting support bars 10, one of the two main vertical supports 11, the two handle support arms 12, and the flexible webbing 13.

Figure 3A:
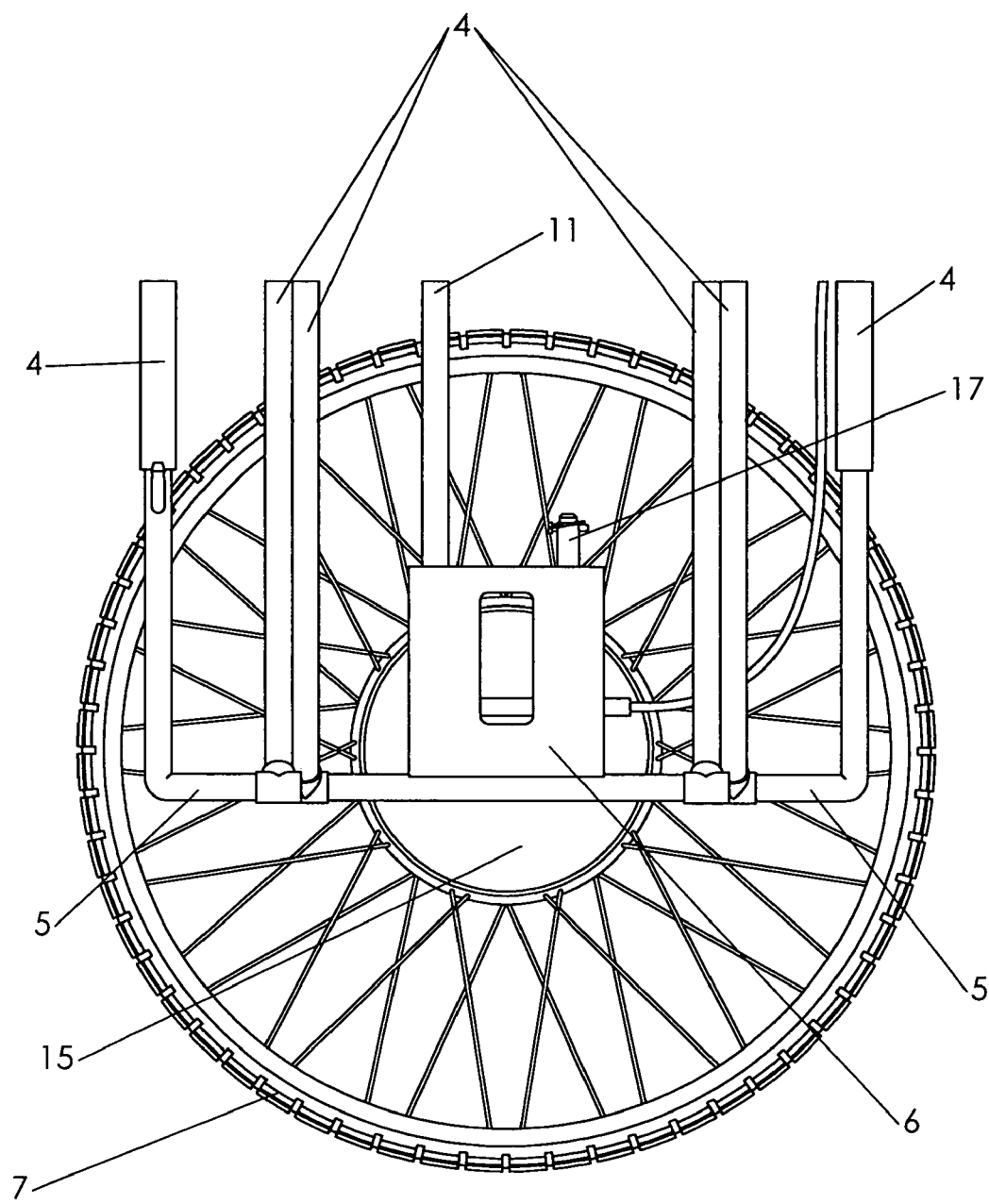
FIG. 3A is a side view of the anchor block of the present invention.
Figure 11:
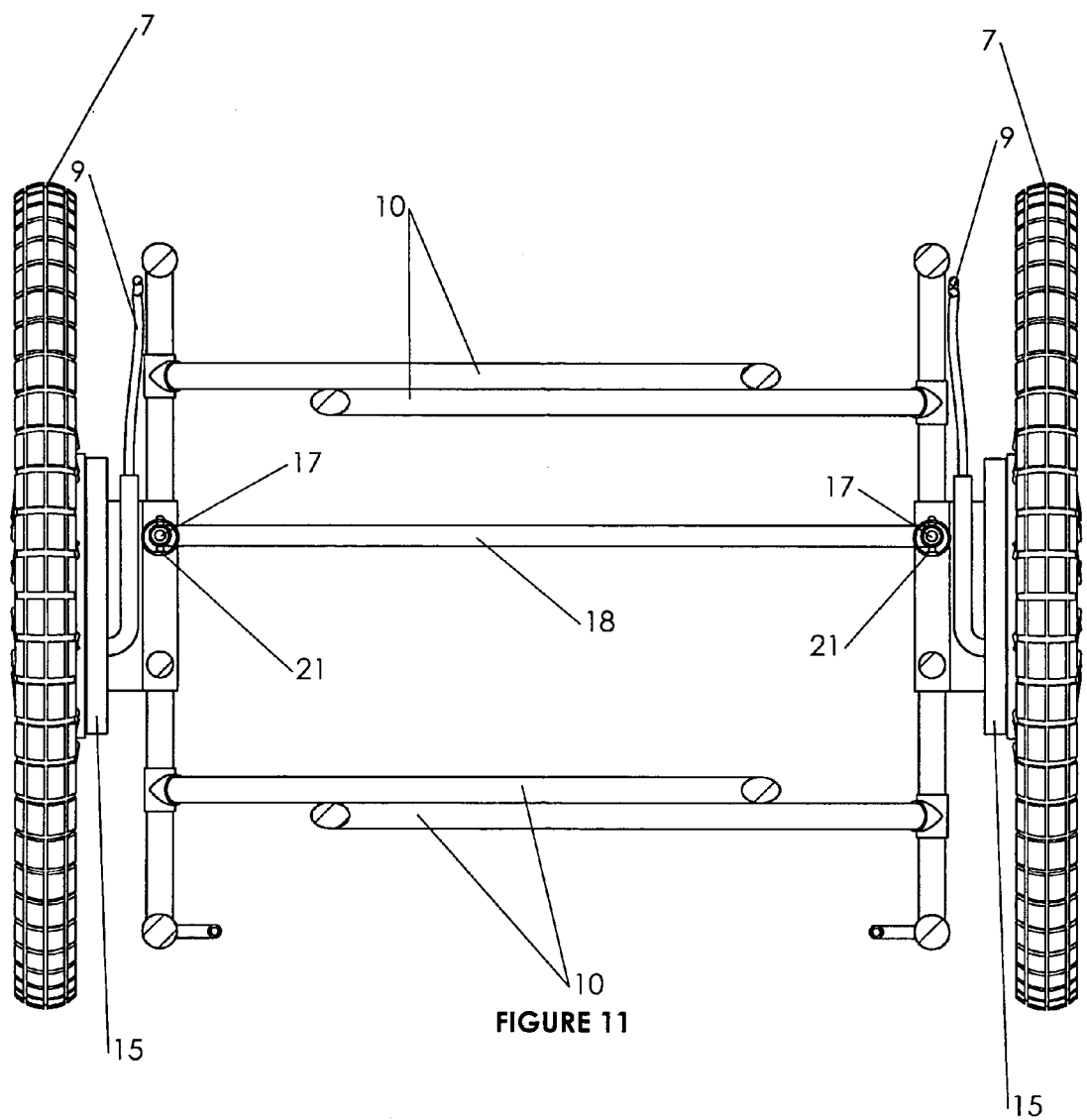
FIG. 11 is a top section view of the cart of the present invention taken horizontally across the cart beneath the mesh carrying platform, handle bars and support bars.

FIG. 3A is a side view of one of the two anchor blocks 6 of the present invention. The anchor block 6 serves three purposes. First, it provides stability to the wheel assembly and manual brake system. Second, it anchors the main vertical support 11. Third, it provides a base for the vertical main horizontal connector extension 17, which holds the main horizontal connector 18 (not shown). As shown in FIG. 11, the main horizontal connector 18 is removably attached to each vertical main horizontal connector extension 17. When the cart is in an operational position, the main horizontal connector 18 prevents the cart from collapsing. In order to convert the cart to a collapsed position for storage or transport, the main horizontal connector 18 is removed.

Figure 4:
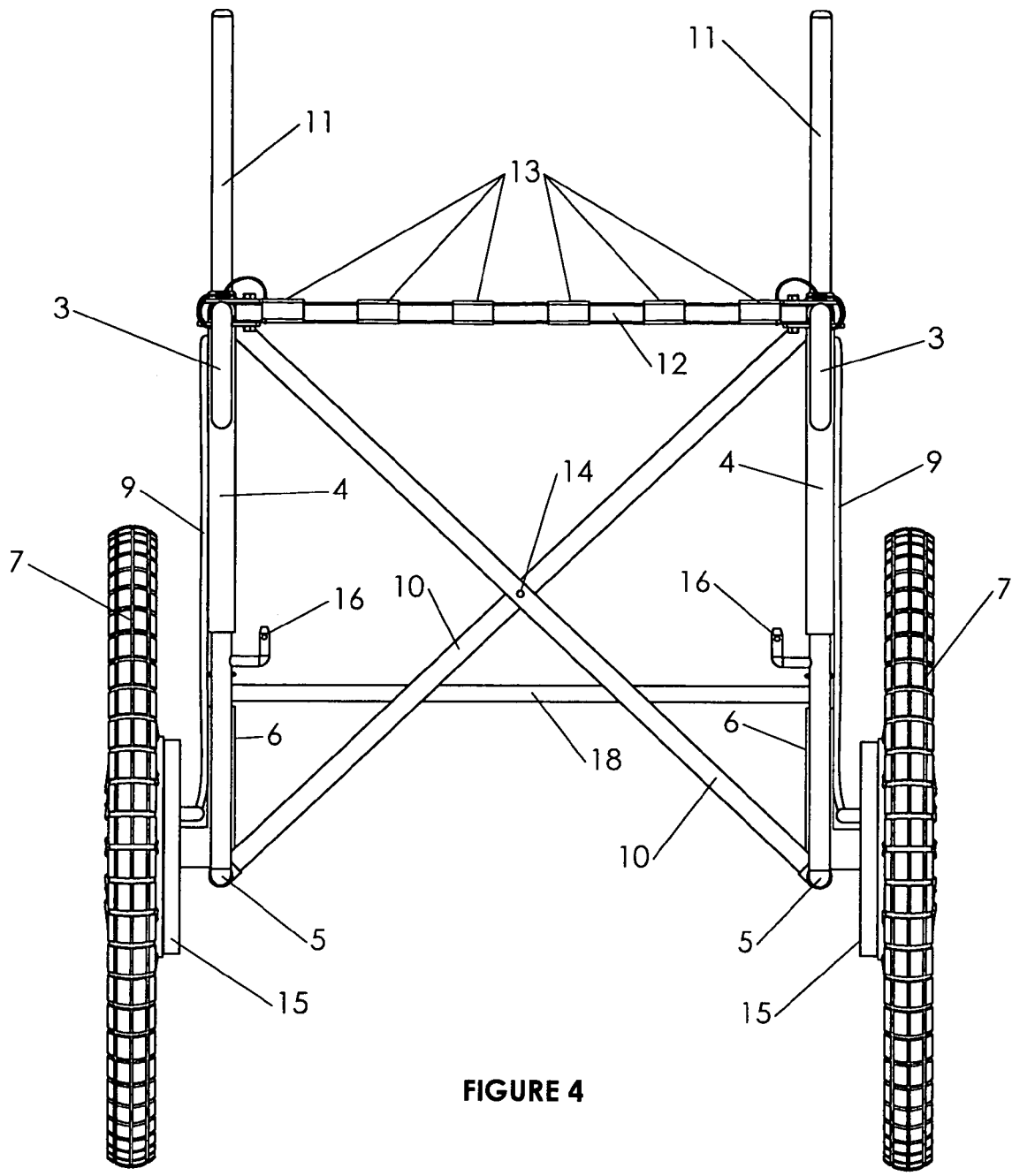
FIG. 4 is a rear view of the cart of the present invention in an operational position.

FIG. 4 is a rear view of the cart of the present invention in an operational position. This figure shows the second end of the handle bars 3, two of the vertical telescoping bars 4, the end of the two horizontal cross-bars 5, the anchor blocks 6, and the wheels 7. It also shows the two diagonal pivoting support bars 10 on the rear end of the cart, as well as the pivot point 14 between the two diagonal pivoting support bars 10. The manual brakes 9, brake drums 15, main vertical supports 11, handle support arm 12, and flexible webbing 13 are also shown, as are the two tongue mount extensions 16, which are discussed more fully in connection with FIGS. 2 and 18.

Figure 5:
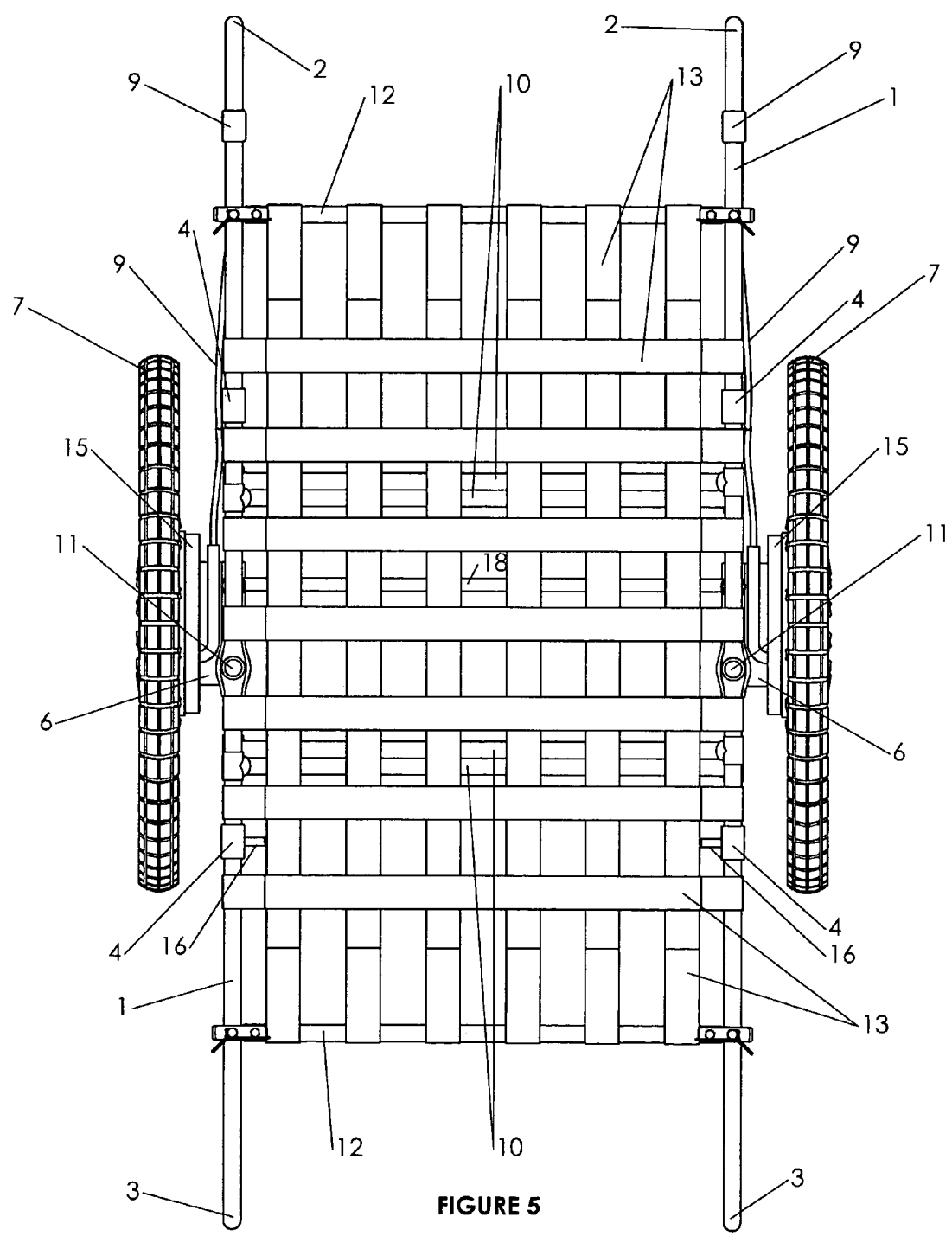
FIG. 5 is a top view of the cart of the present invention in an operational position.

FIG. 5 is a top view of the cart of the present invention in an operational position. This figure shows the elongate handle bars 1, the first 2 and second 3 ends of the handle bars 1, the tops of the vertical telescoping bars 4 (where they attach to the handle bars 1), the anchor blocks 6, the wheels 7, and the manual brakes 9, which are attached at one end to the first end 2 of the handle bars 1 and at the other end to the brake drums 15. The diagonal pivoting support bars 10, the top of the main vertical supports 11, and the handle support arms 12 are also shown, as is the flexible webbing 13. The tongue mount extensions 16, which protrude inward from the lower portion of the two rear vertical telescoping bars 4, are also shown.

FIGS. 6–9 are a perspective view of a handle support arm with the pivoting extension perpendicular to the rest of the support bar, a top view of a handle support arm with the pivoting extension perpendicular to the rest of the support bar, a perspective view of a handle support arm with the pivoting extension parallel to the rest of the support bar, and a side view of a handle support arm with the pivoting extension parallel to the rest of the support bar, respectively. The handle support arms 12 are used only when the cart is in an operational position, and as shown in FIGS. 6–9, they can be removably attached to the handle bars. The present invention is not limited to any particular method of removably attaching the handle support arms 12 to the handle bars. One such method is shown in FIGS. 6–9. In this embodiment, each end of each handle support arm 12 comprises a fixed extension 19, a pivoting extension 20, and a lynch pin 21. To install the handle support arm 12 on the cart, the handle bar (not shown) is placed between the fixed extension 19 and the pivoting extension 20, which is rotated so that it is parallel with the rest of the handle support arm 12, as shown in FIGS. 8 and 9. The lynch pin is then inserted through the top of the fixed extension 19, through a hole in the handle bar (not shown), and through the pivoting extension 20 to lock the handle support arm in place.

In addition, the handle support arms 12 need to be threaded through the ends of whatever material is used for the carrying platform. In one embodiment, that material is a nylon webbing, and in that case, the handle support arms 12 would be threaded through the ends of the webbing before being attached to the handle bars. In order to collapse the cart, the handle support arms 12 are removed, as is the main horizontal connector 18 shown in FIGS. 1–2 and 4–5.

Figure 10:
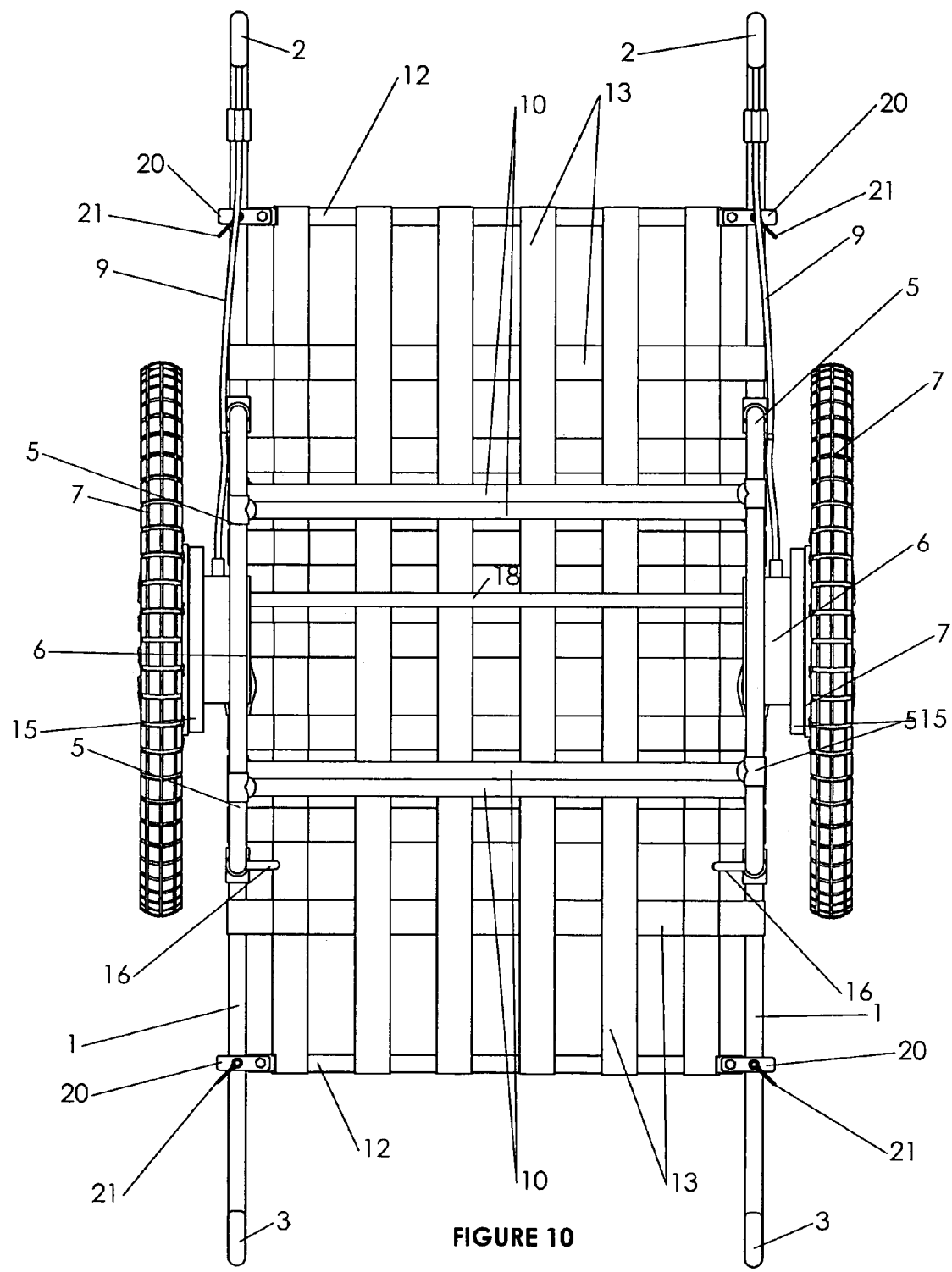
FIG. 10 is a bottom view of the cart of the present invention in an operational position.

FIG. 10 is a bottom view of the cart of the present invention in an operational position. This figure shows the elongate handle bars 1, the first 2 and second 3 ends of the handle bars 1, the horizontal cross-bars 5, the anchor blocks 6, the wheels 7, and the manual brakes 9. It also shows the diagonal pivoting support bars 10, the handle support arms 12 and pivoting extensions 20 and lynch pins 21 of the handle support arms 12, the flexible webbing 13, and the brake drums 15. In addition, the tongue mount extensions 16 and main horizontal connector 18 are shown.

FIG. 11 is a top section view of the cart of the present invention taken horizontally across the cart beneath the mesh carrying platform, handle bars and handle support arms. This figure shows the diagonal pivoting support bars 10 and the main horizontal connector 18, which is removably attached on both ends to the anchor blocks 6. The present invention is not limited to any particular method of attaching the main horizontal connector 18 to the anchor blocks 6. In the embodiment shown in this figure, the main horizontal connector 18 is attached to the anchor blocks 6 by placing either end of the main horizontal connector 18 over the top of a vertical main horizontal connector extension 17 that extends from the top of the anchor block 6. The main horizontal connector 18 is then secured in place with a lynch pin 21.

FIGS. 12–17 show the cart in a collapsed position for transport or storage. In these figures, the handle support arms 12 and main horizontal connector 18 have been removed. Once the handle support arms 12 and main horizontal connector 18 are removed, the cart is simply collapsed by pulling upward on the handle bars, which causes them to slide upward on the main vertical supports 11 and forces the vertical telescoping bars 4 to extend. At the same time, the diagonal pivoting support bars 10 pivot at their pivot points 14 and rotate on the handle bars 1 and at the horizontal cross-bar 5 to allow the cart to collapse. The vertical telescoping bars 4 also rotate at the point at which they attach to the handle bars 1, but they are fixedly attached to the horizontal cross-bar 5. The cart can also be collapsed by placing it on its side and allowing gravity to force it to collapse.

Figure 12:
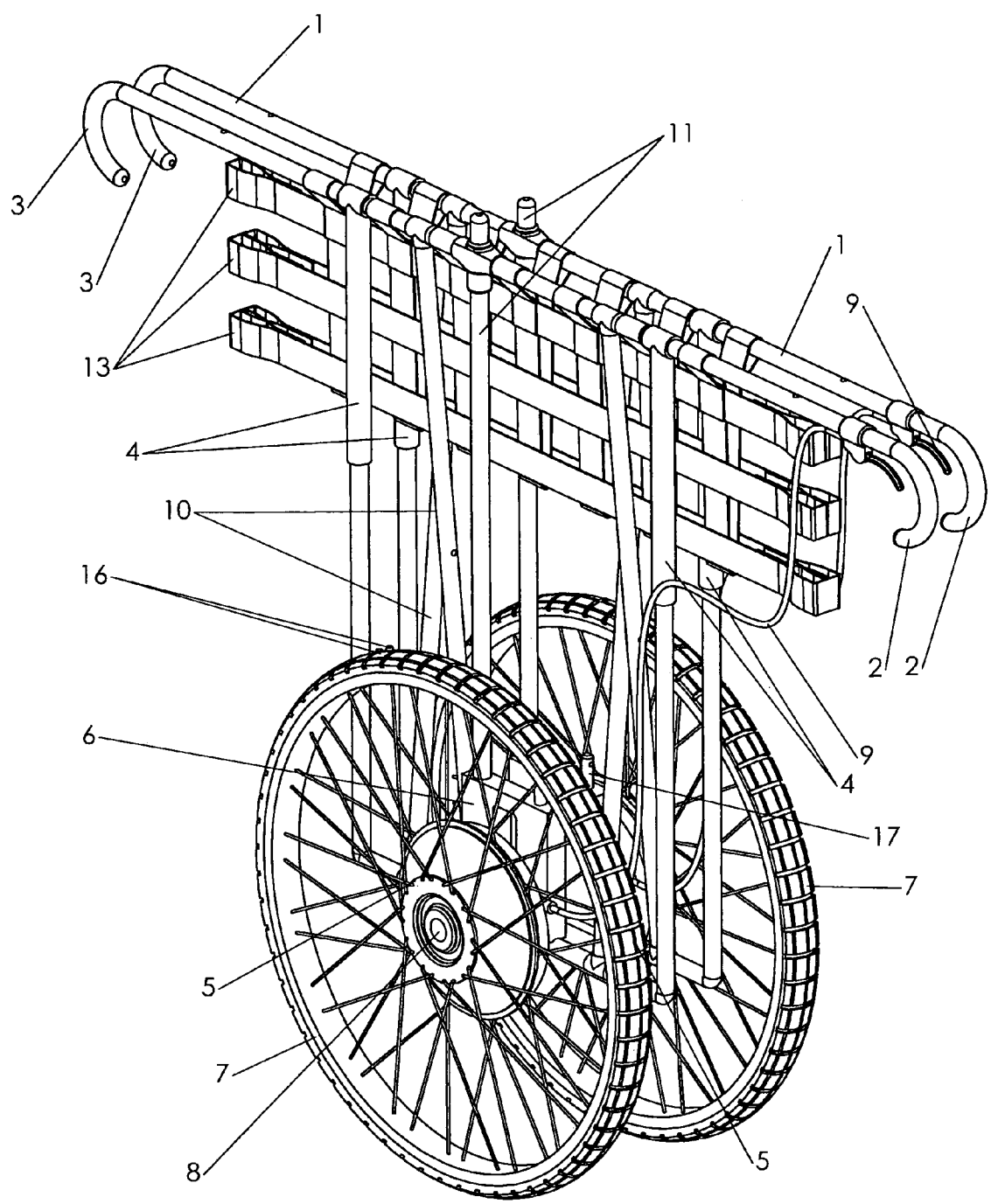
FIG. 12 is a front perspective view of the cart of the present invention in a collapsed position.
Figure 13:
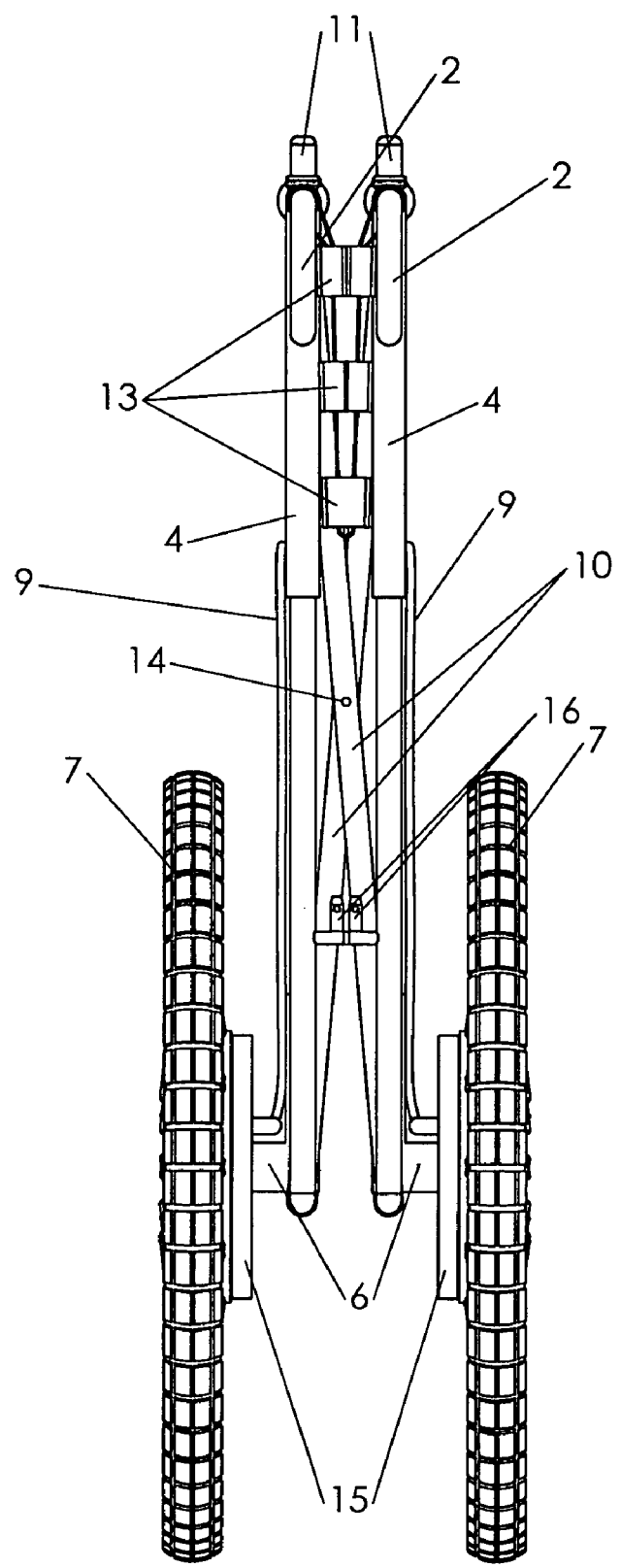
FIG. 13 is a front view of the cart of the present invention in a collapsed position.
Figure 14:
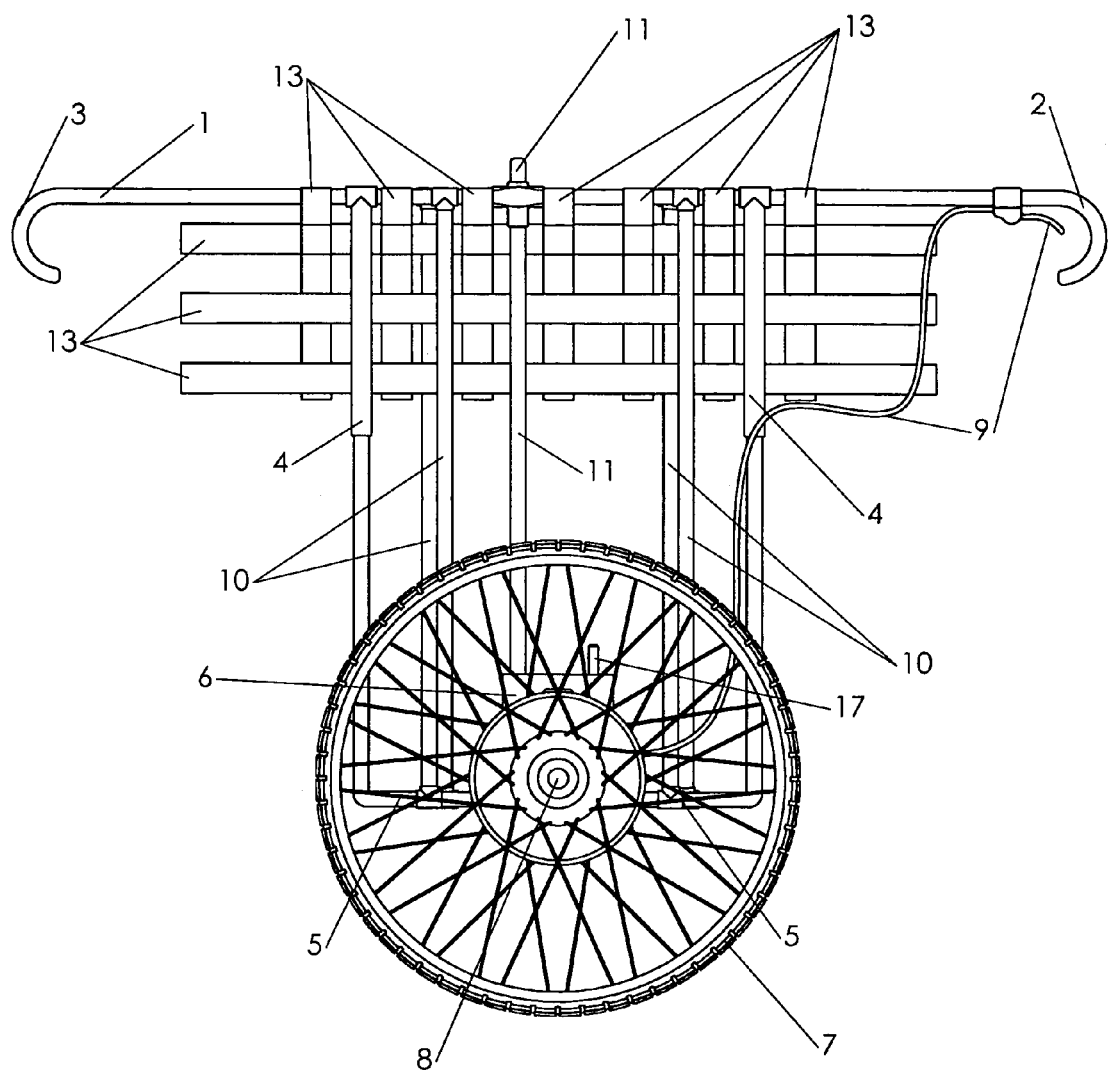
FIG. 14 is a side view of the cart of the present invention in a collapsed position.
Figure 15:
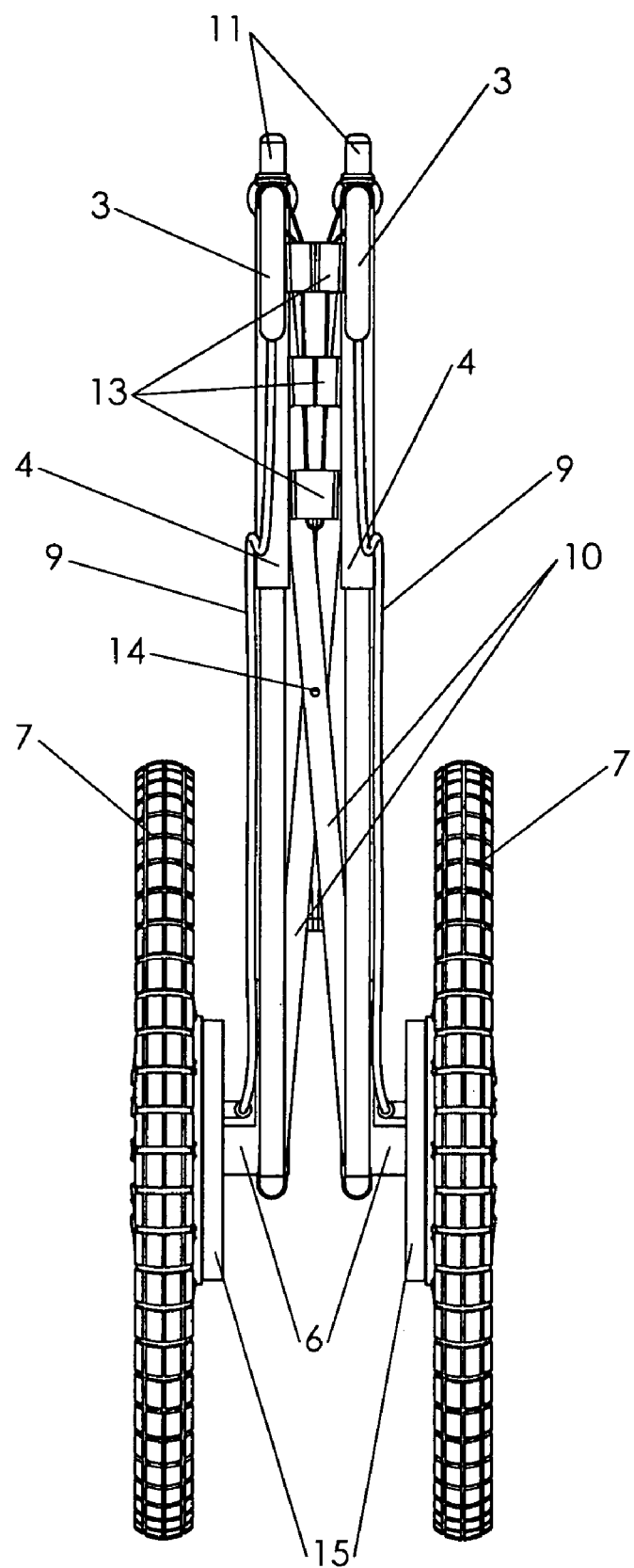
FIG. 15 is a rear view of the cart of the present invention in a collapsed position.
Figure 16:
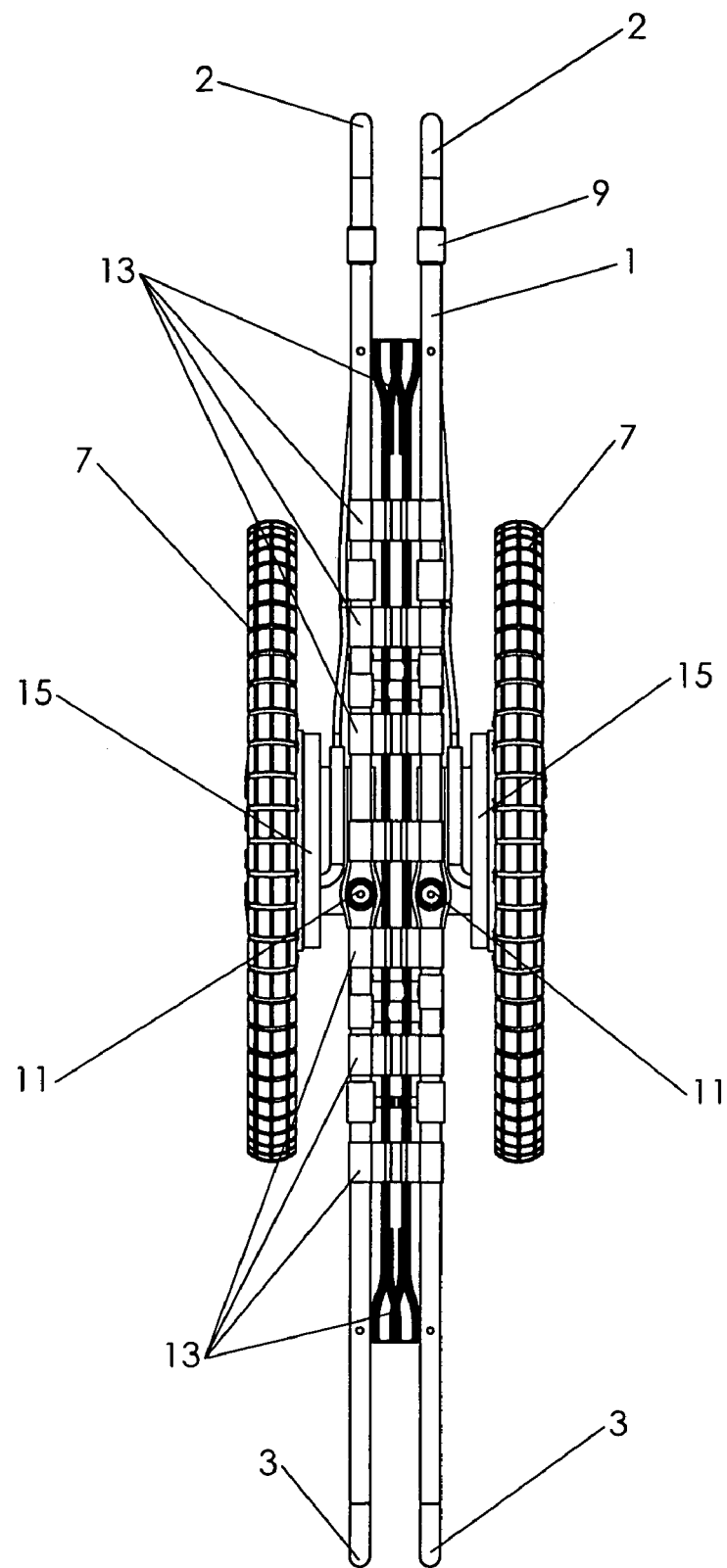
FIG. 16 is a top view of the cart of the present invention in a collapsed position.
Figure 17:
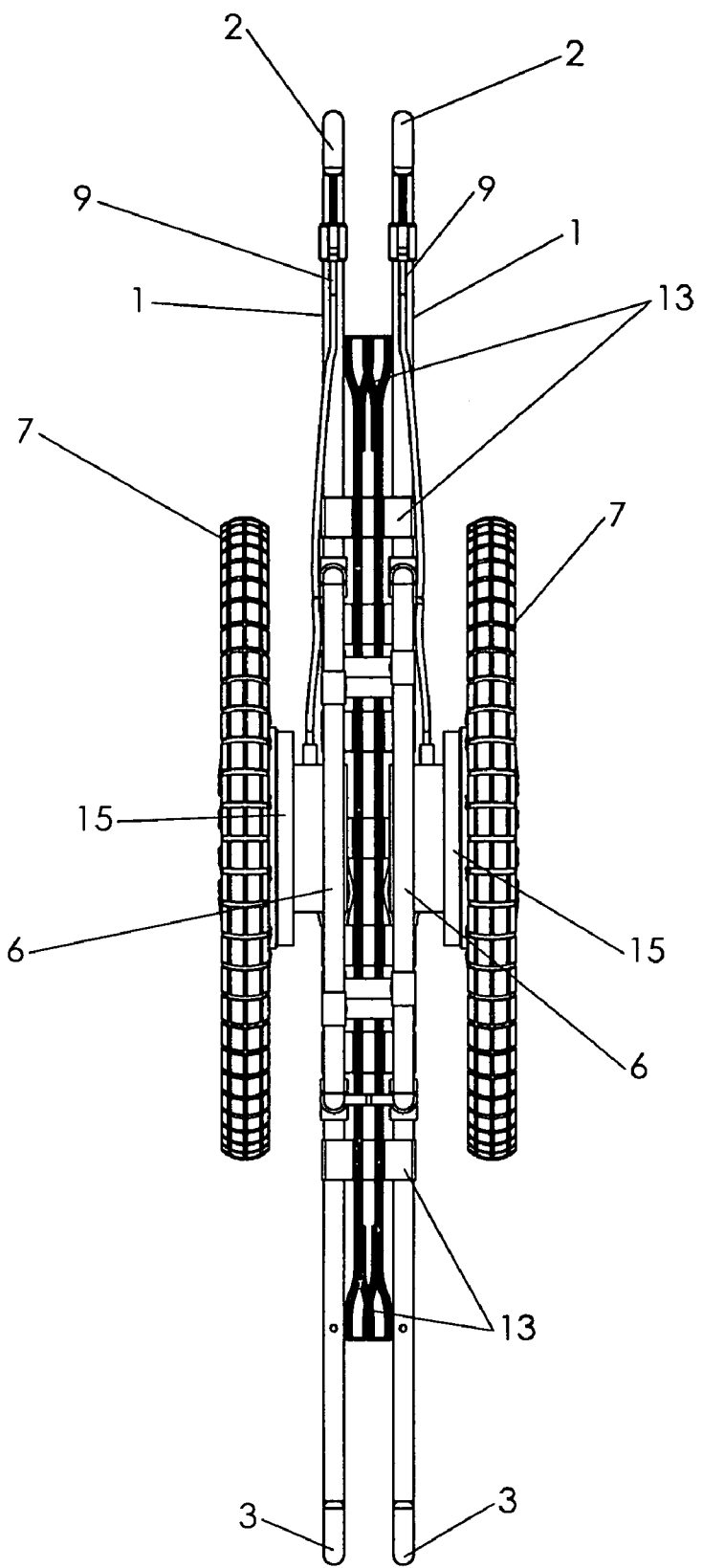
FIG. 17 is a bottom view of the cart of the present invention in a collapsed position.

FIG. 12 is a front perspective view of the cart of the present invention in a collapsed position. FIG. 13 is a front view of the cart of the present invention in a collapsed position. FIG. 14 is a side view of the cart of the present invention in a collapsed position. FIG. 15 is a rear view of the cart of the present invention in a collapsed position. FIG. 16 is a top view of the cart of the present invention in a collapsed position. FIG. 17 is a bottom view of the cart of the present invention in a collapsed position. The various parts of the cart as shown in these figures have all been identified previously.

Figure 18:
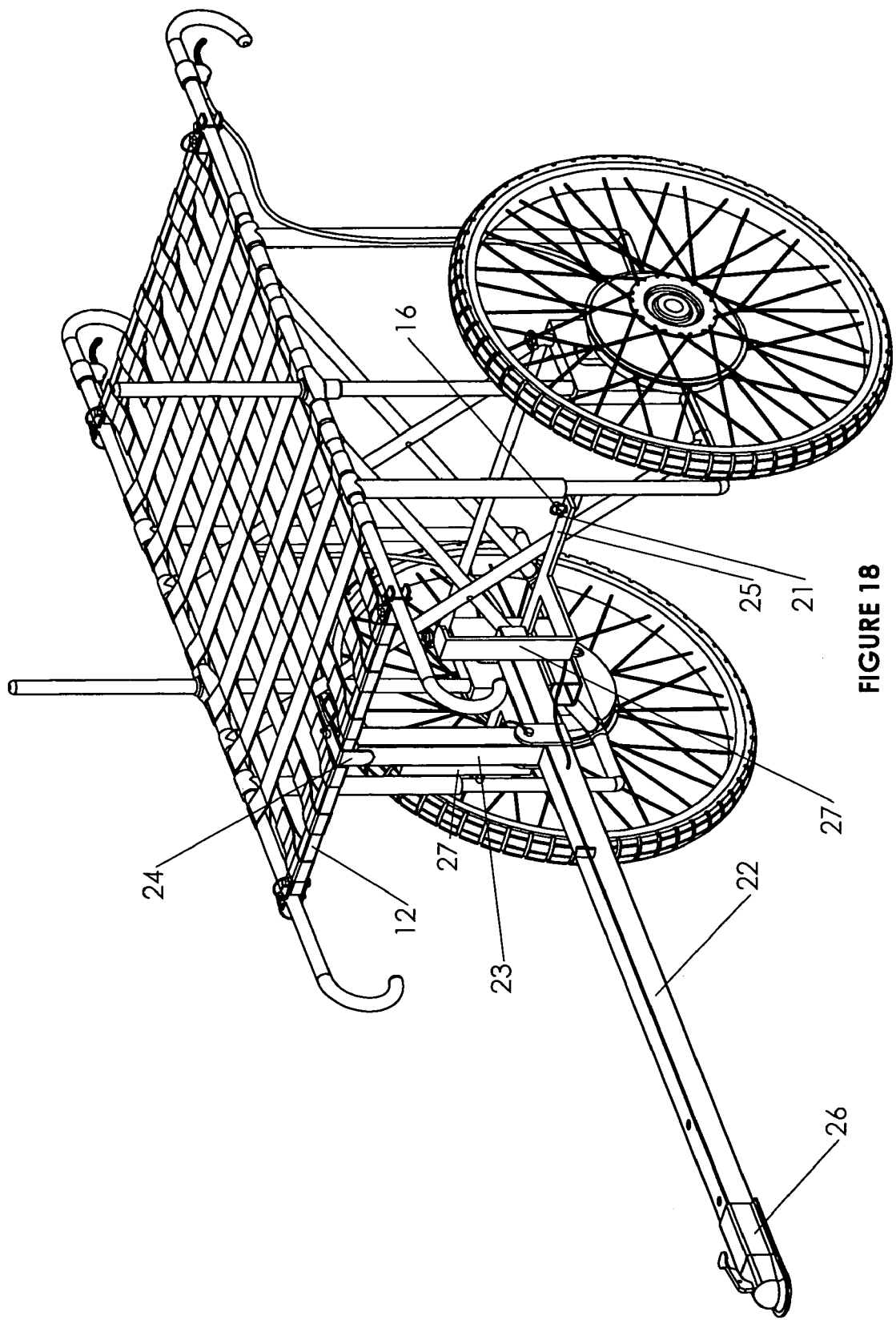
FIG. 18 is a rear perspective view of the trailer embodiment of the cart of the present invention.
Figure 18A:
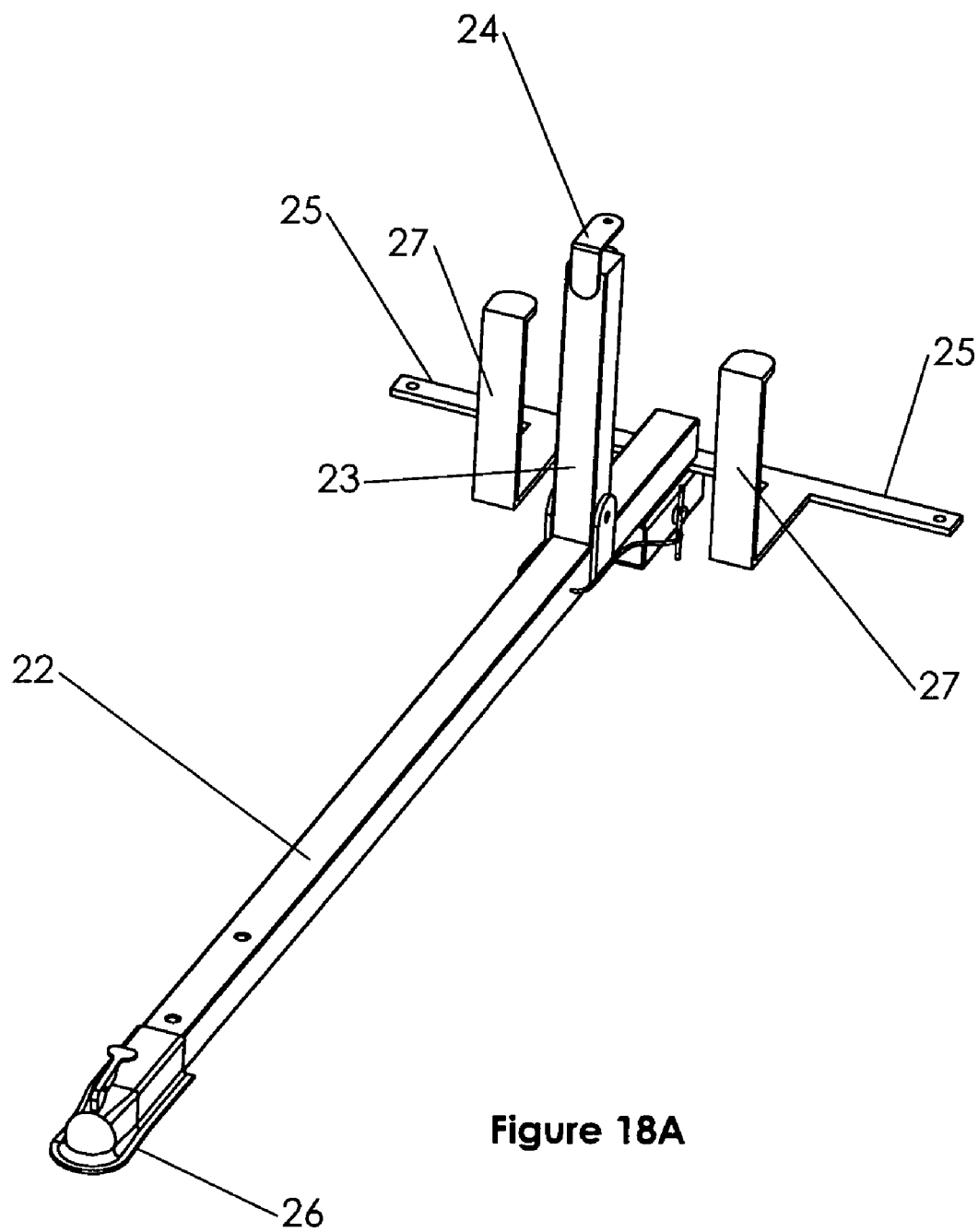
FIG. 18A is a perspective view of the tongue of the present invention.
Figure 19:
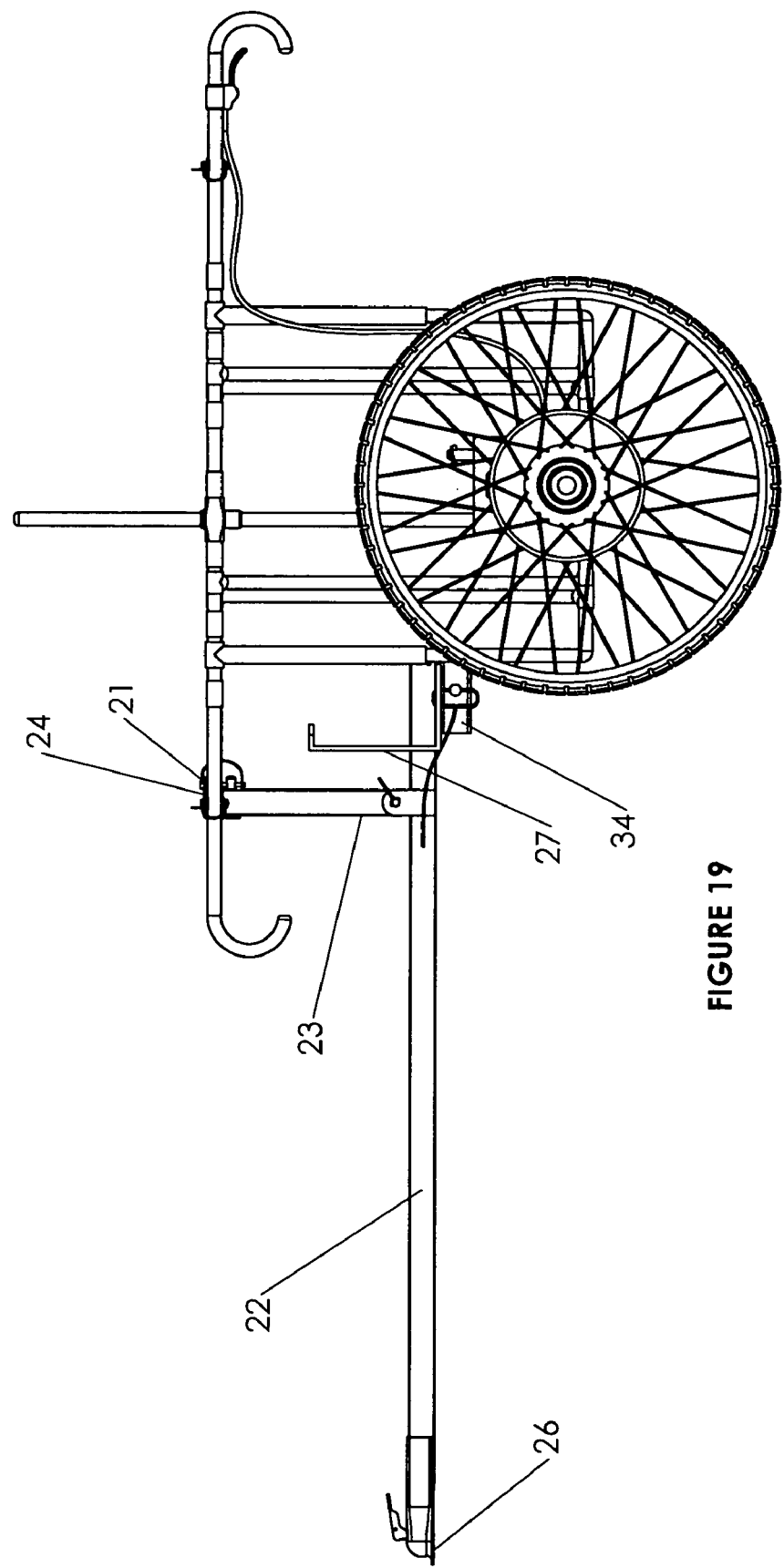
FIG. 19 is a side view of the trailer embodiment of the cart of the present invention.
Figure 26:
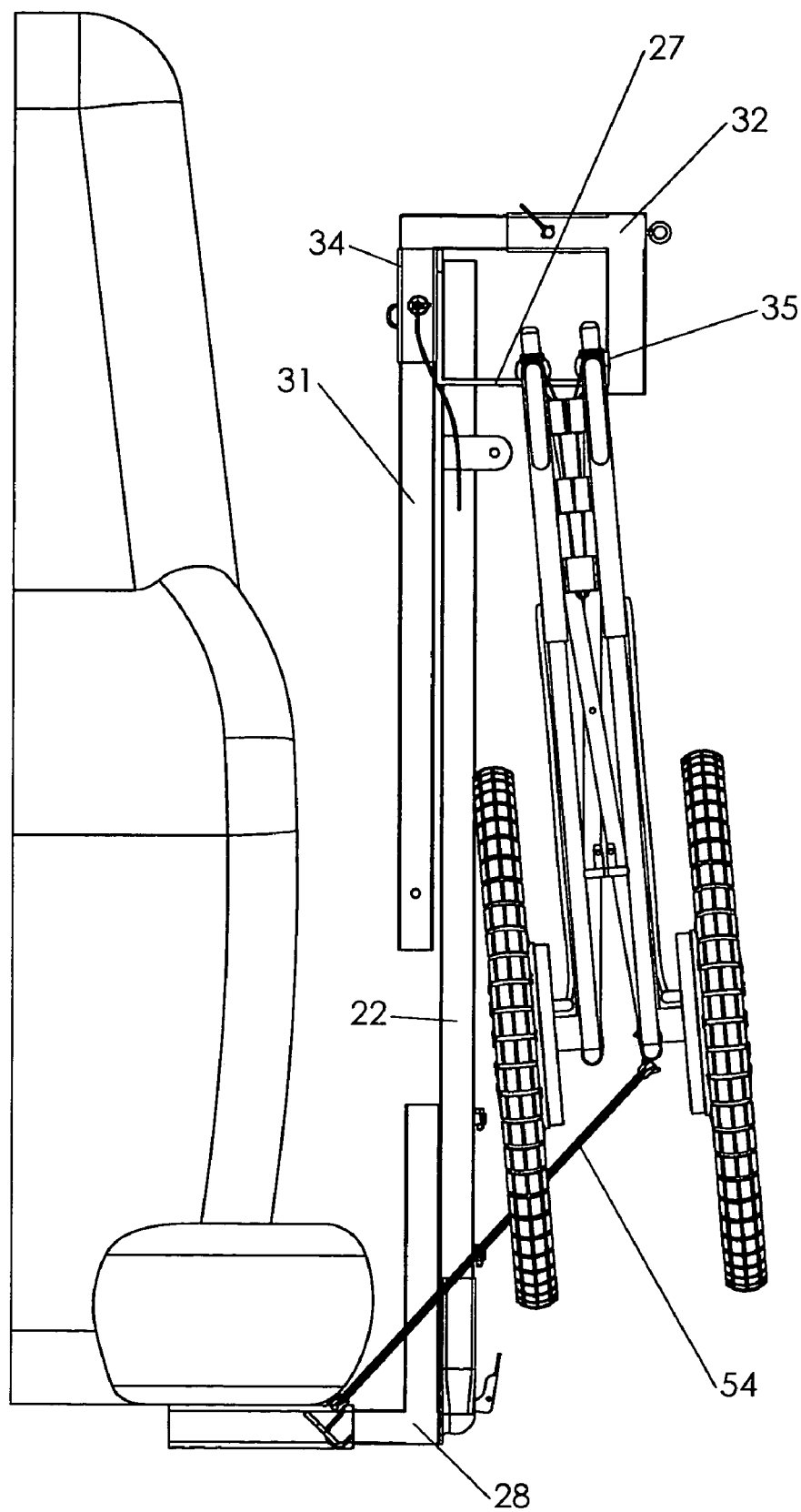
FIG. 26 is a side view of the transport mechanism and a rear view of the cart mounted on a vehicle.

FIGS. 18–20 show the cart after it has been converted to a trailer. FIG. 18A shows the tongue 22, brace 23 and locking bracket 24 that are used to convert the cart to a trailer. FIG. 18 is a rear perspective view of the trailer embodiment of the cart of the present invention. In the preferred embodiment, the tongue comprises two lateral wings 25, each of which has a hole through which the vertical portion of the tongue mount extension 16 is inserted. The tongue 22 also comprises a trailer hitch 26 and two transport arms 27. The transport arms 27 are not used when the cart is in a trailer configuration, but they do serve a purpose in transporting the cart on the back of a vehicle (as shown in FIGS. 26 and 28). To convert the cart to a trailer, the lateral wings 25 of the tongue are placed over the tongue mount extension 16 and locked into place, preferably with a lynch pin 21. The brace 23 is attached to the tongue on one end (as shown in FIG. 18, with a lynch pin), and it abuts up against the handle support arm 12 on the rear of the cart at the other end. The locking bracket 24 is used to secure the brace 23 to the handle support arm 12. In this manner, the cart is stabilized for use as a trailer.

FIG. 19 is a side view of the trailer embodiment of the cart of the present invention. This figure shows the tongue 22, brace 23, locking bracket 24, trailer hitch 26 and transport arms 27. FIG. 20 is a perspective view of the trailer embodiment of the cart attached to a vehicle. FIG. 21 is a partial perspective view of the trailer embodiment of the cart taken at the circle shown in FIG. 20. As shown in this figure, the present invention comprises a receiver 28 that can be attached to the rear of any vehicle. The receiver 28 is specially designed to hold the tongue 22 when the cart is in a transport position (as shown in FIG. 26). It can also hold a trailer ball attachment 29, as shown in FIG. 21.

Figures 22, 23:
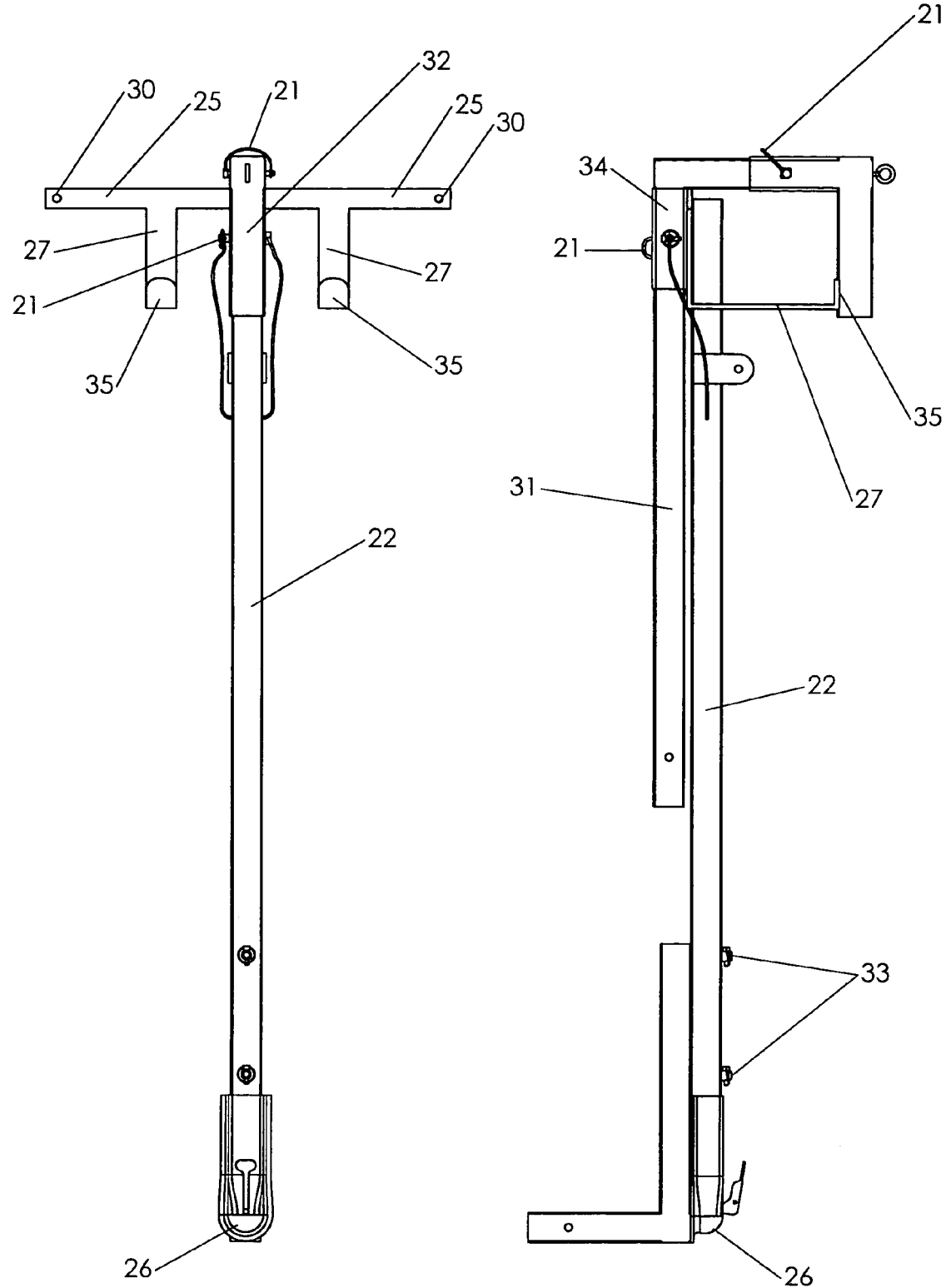
FIG. 22 is a front view of the transport mechanism of the present invention.
FIG. 23 is a side view of the transport mechanism of the present invention.

FIGS. 22–26 relate to the transport mechanism of the present invention. FIG. 22 is a front view of the tongue of the present invention. This figure shows the lateral wings 25, transport arms 27, and trailer hitch 26. It also shows the two apertures 30 through which the vertical portions of the tongue mount extensions 16 are inserted when the cart is in a trailer position. FIG. 23 is a side view of the transport mechanism of the present invention. The transport mechanism comprises the tongue 22, the receiver 28, an loading bar 31, and a corner piece 32. To transport the cart, the tongue 22 is attached to the receiver 28. In the embodiment illustrated in FIG. 23, the tongue 22 is attached to the receiver 28 by two pegs 3.3 that are attached to the receiver 28, extend through holes in the tongue 22, and are secured by lynch pins 21.

The tongue 22 also comprises a transport sleeve 34, which is preferably a piece of hollow steel tubing. The loading bar 31 slides through the transport sleeve 34 until the top (horizontal part) of the loading bar 31 prevents it from sliding any further. The loading bar 31 is preferably secured in place with a lynch pin. Next, the cart is loaded onto the transport arms 27, and the corner piece 32 is secured to the top part of the loading bar 32, as shown in FIG. 23. The transport arms 27 comprise transport safety tabs 35 that prevent the cart from falling off after it has been loaded onto the transport arms 27. The corner piece 32 serves to further hold the cart in place.

Figure 24:
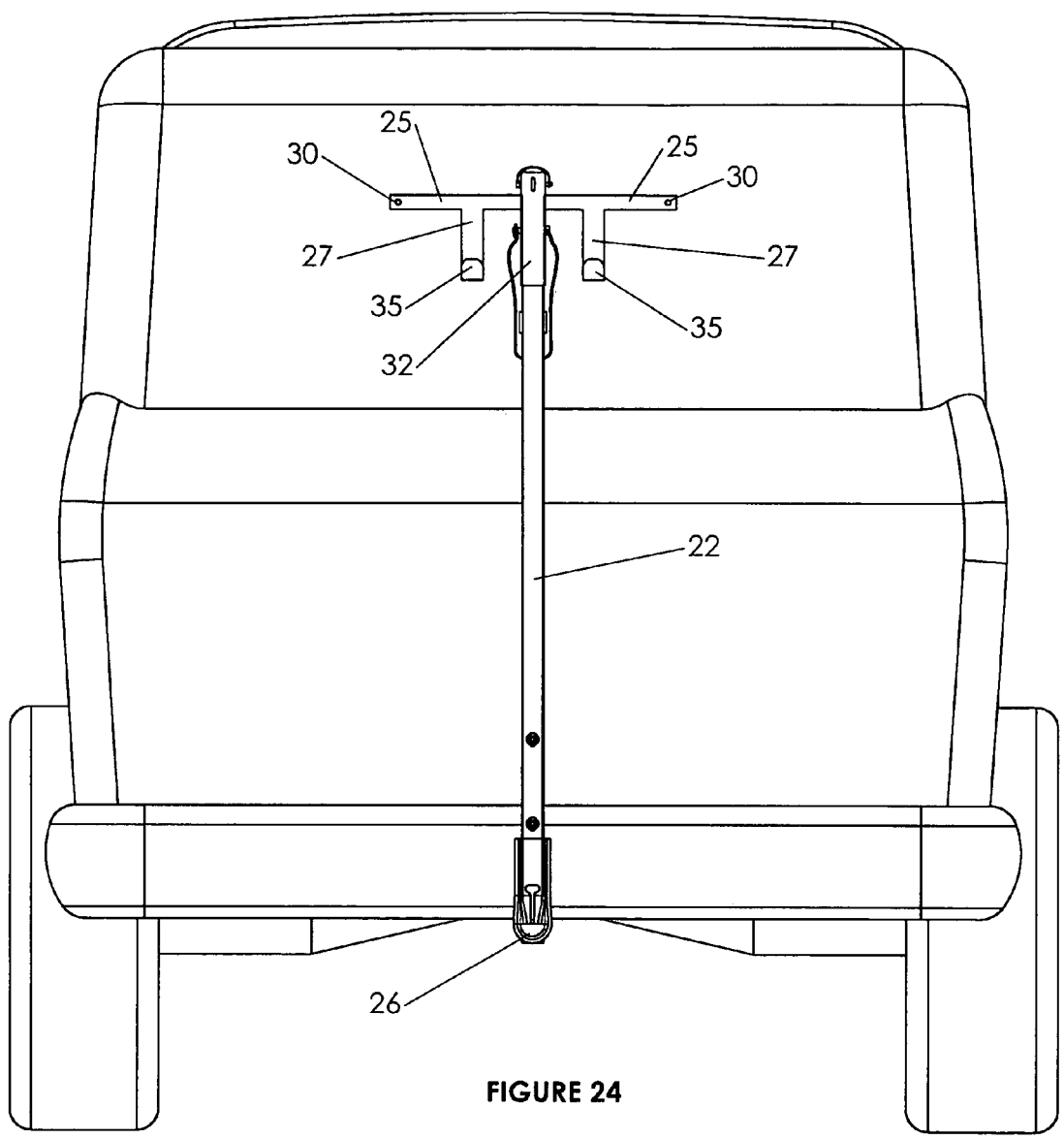
FIG. 24 is a front view of the transport mechanism mounted on a vehicle.
Figure 25:
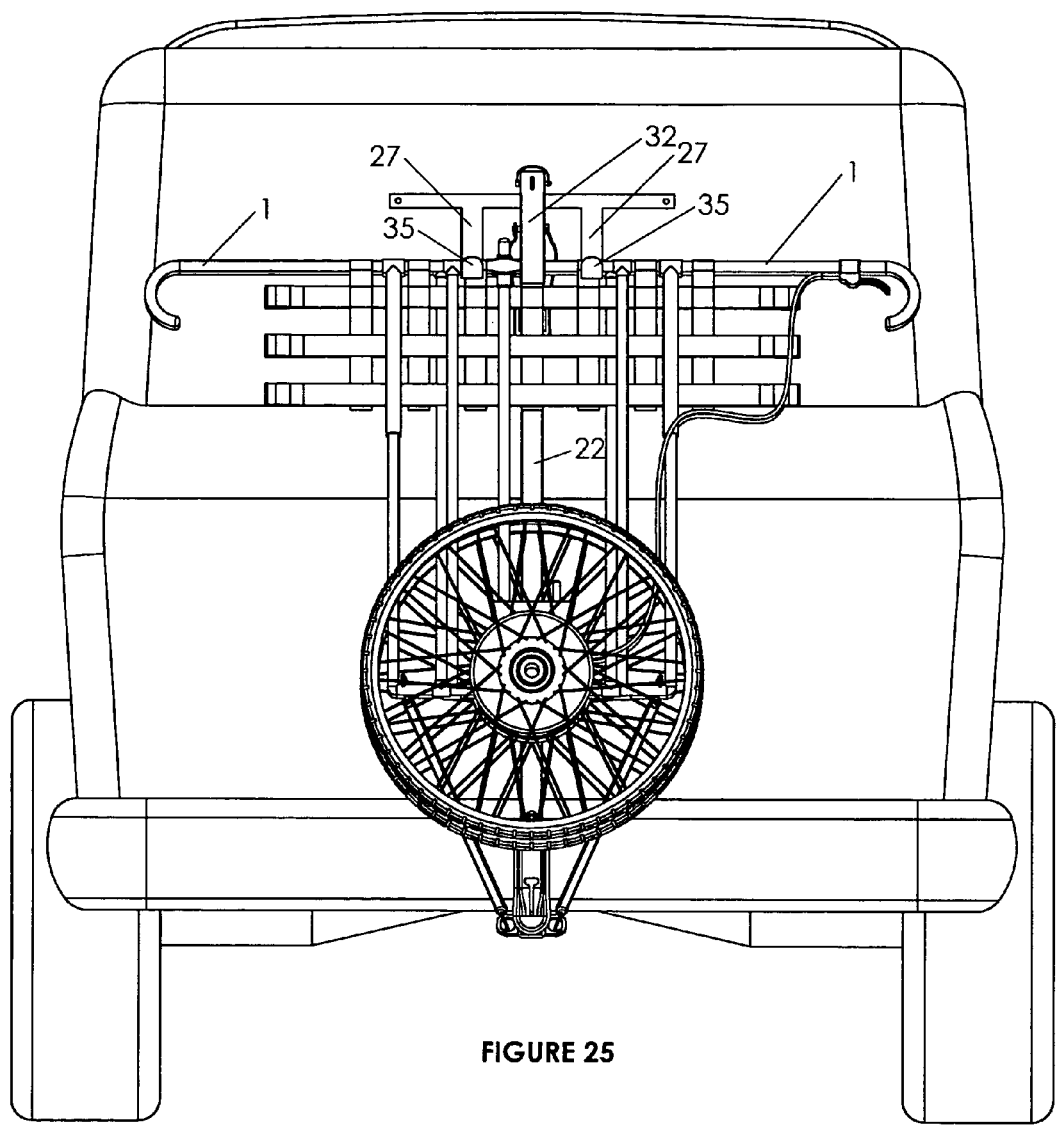
FIG. 25 is a front view of the transport mechanism and a side perspective view of the cart mounted on a vehicle.

FIG. 24 is a front view of the transport mechanism mounted on a vehicle. FIG. 25 is a front view of the transport mechanism and a side perspective view of the cart mounted on a vehicle. As shown in this figure, with the cart in a collapsed position, the handle bars 1 of the cart are placed over the transport safety tabs 35 and onto the transport arms 27. The corner piece 32 is then installed to further secure the cart. FIG. 26 is a side view of the transport mechanism and a rear view of the cart mounted on a vehicle. This figure shows the receiver 28, tongue 22, transport sleeve 34, loading bar 31, corner piece 32, transport arms 27 and transport safety tabs 35. The cart can be optionally secured with bungee cords 54 on either side of the cart to prevent it from rocking from side to side during transport.

Figure 27:
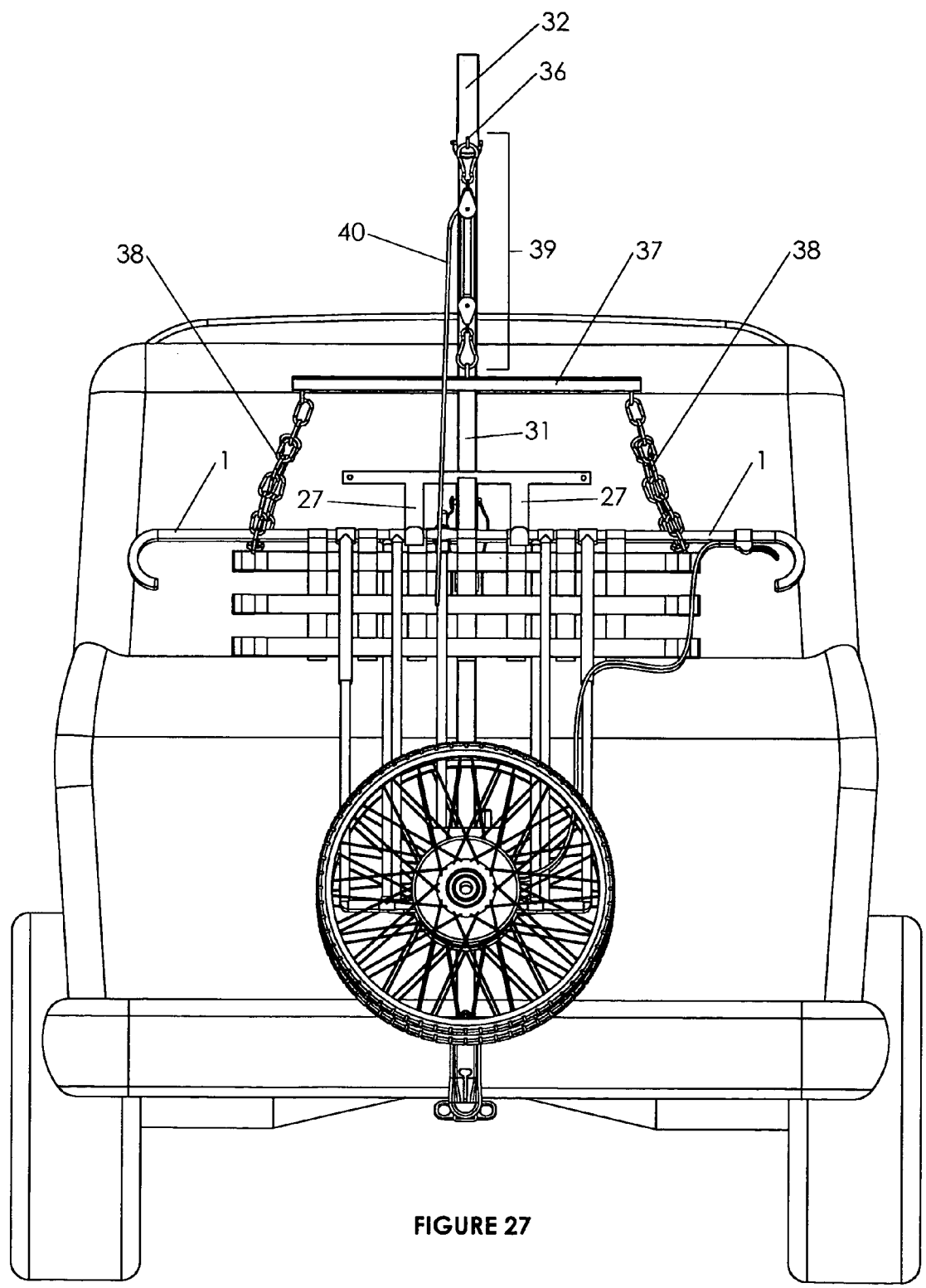
FIG. 27 is a front view of the transport and hoist mechanisms and a side perspective view of the cart mounted on a vehicle.

FIGS. 27–30 illustrate the hoist mechanism of the present invention. The hoist mechanism is used to facilitate the lifting of the cart off of or onto the transport mechanism. FIG. 27 is a front view of the transport and hoist mechanisms and a side perspective view of the cart mounted on a vehicle. This figure is the same as FIG. 25, except that the hoist mechanism has been attached to an eyelet on the front of the corner piece 32. Before attaching the hoist mechanism, the corner piece 32 is reversed in orientation so that the front of the corner piece 32 extends upward (as shown in FIG. 28) rather than downward (as it would in a transport position). The hoist mechanism comprises a horizontal bar 37, two chains 38, and a pulley system 39, as is known in the art. The loading bar 31 is pushed upward through the transport sleeve 34 (not shown) and locked into place, preferably with a lynch pin. The chains 38 are secured around the handle bars 1 on each end of the cart. The cart can now be lifted off the transport mechanism by pulling on the rope 40 of the pulley system 39, which lifts the cart up and off of the transport arms 27. The cart can now be slowly lowered to the ground by letting up on the rope 40.

FIG. 28 is a side view of the transport and hoist mechanisms and a side perspective view of the cart mounted on a vehicle. FIG. 29 is a side view of the corner piece when it is in hoist position. FIG. 30 is a perspective view of the hoist system of the present invention. The hoist system comprises a pulley system 39, a horizontal bar 37, two chains 38, a rope 40 and at least one hook 41. The hook 41 attaches to the eyelet 36 on the outside of the corner piece 32, as shown in FIG. 29.

Figure 31:
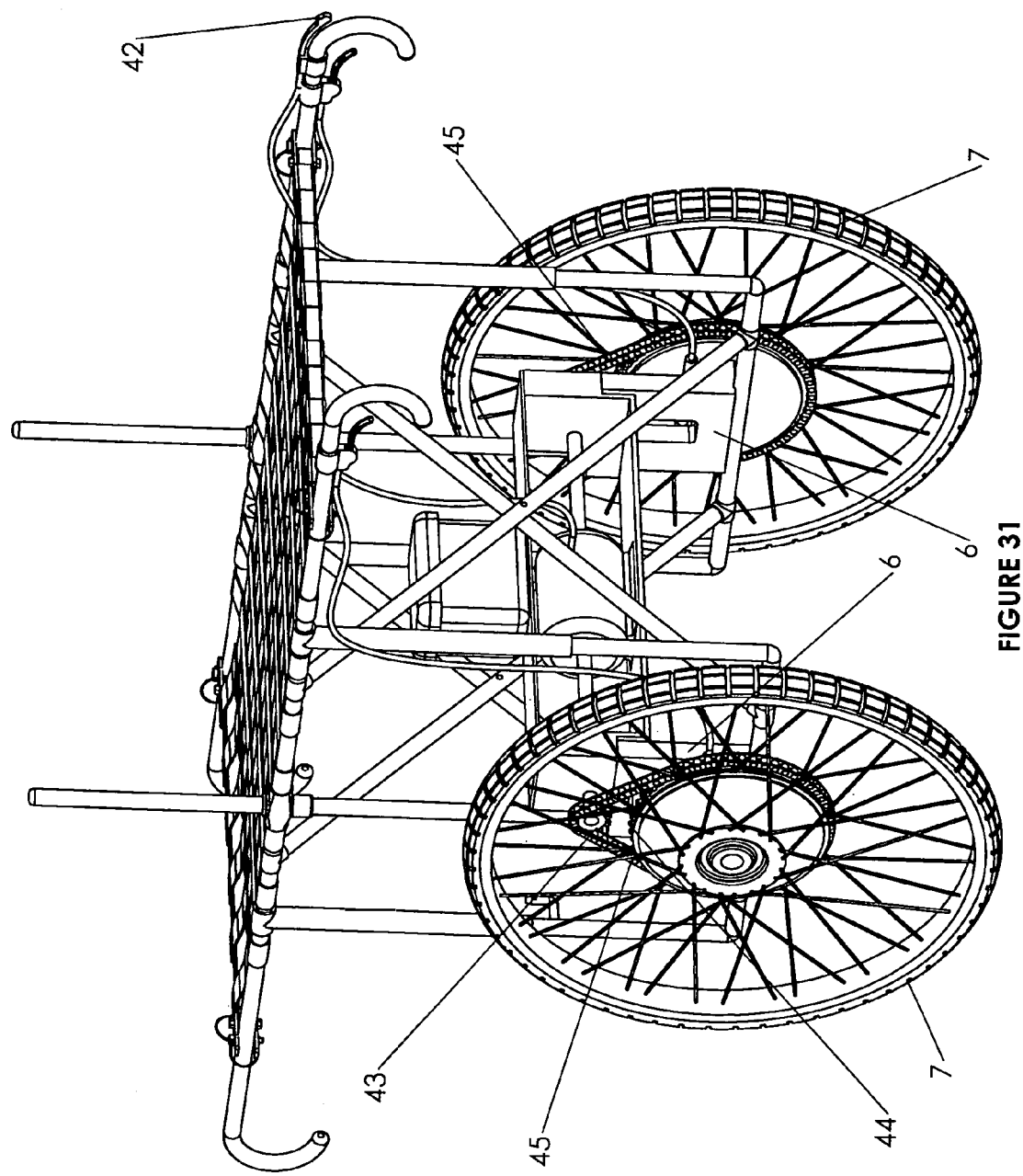
FIG. 31 is a front perspective view of the motorized embodiment of the cart of the present invention.

FIGS. 31–35 show a motorized embodiment of the cart, which can be used for search and rescue purposes or any other purpose in which a motorized version of the cart is desired. FIG. 31 is a front perspective view of the motorized embodiment of the cart of the present invention. This embodiment is the same as the hand-operated version depicted in the previous figures, except that a motor drive assembly has been added. The motor drive assembly sits between the two anchor blocks 6 and is controlled by a speed control lever 42 located on the first end 2 of one of the handle bars 1. The motor drive assembly comprises a drive sprocket 43, a driven wheel sprocket 44, and a drive chain 45 on each side of the cart. The motor drives the drive sprocket 43, which in turn drives the drive chain 45, which in turn drives the driven wheel sprocket 44, which cause the wheel 7 to turn.

Figure 32:
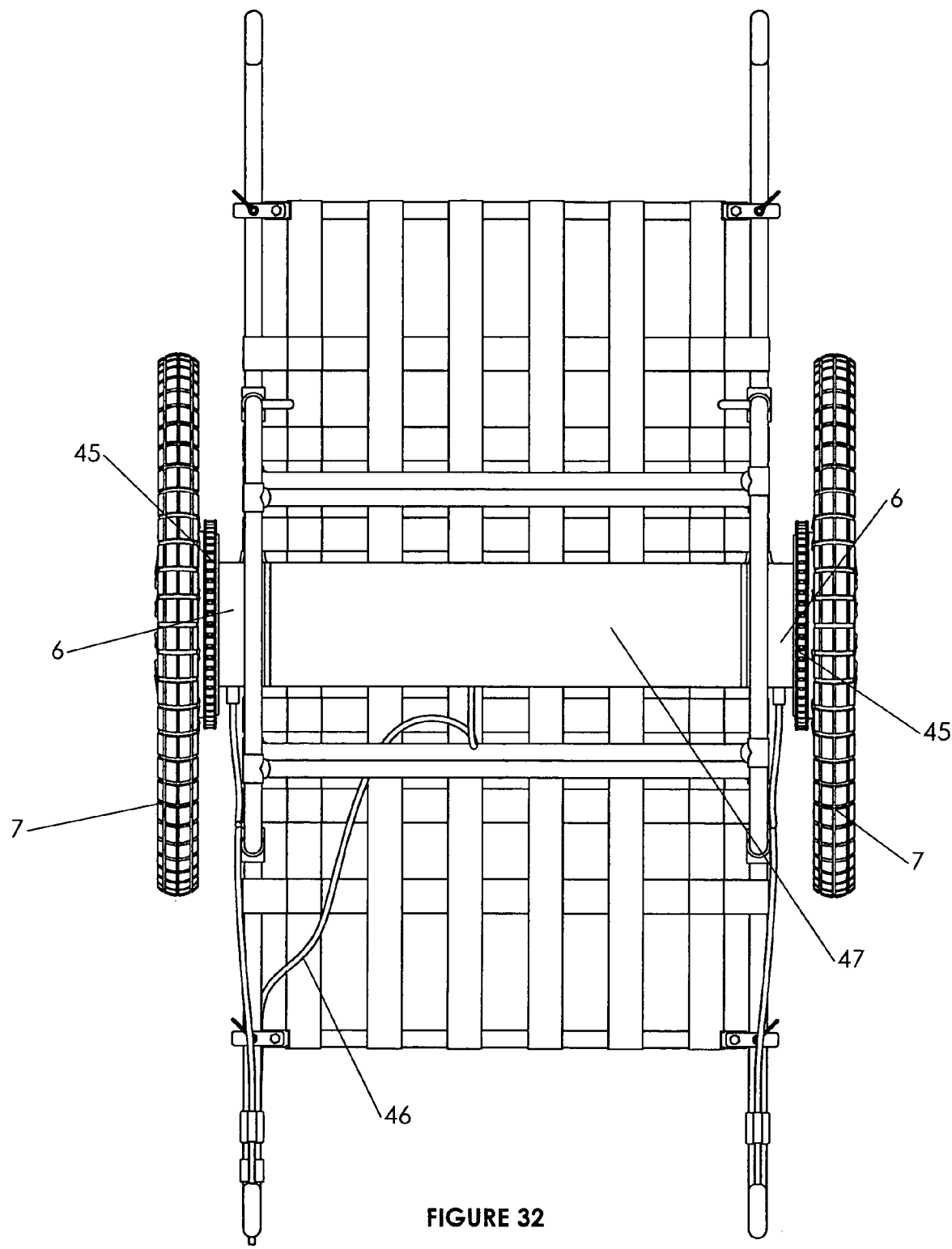
FIG. 32 is a bottom view of the motorized embodiment of the cart of the present invention.
Figure 33:
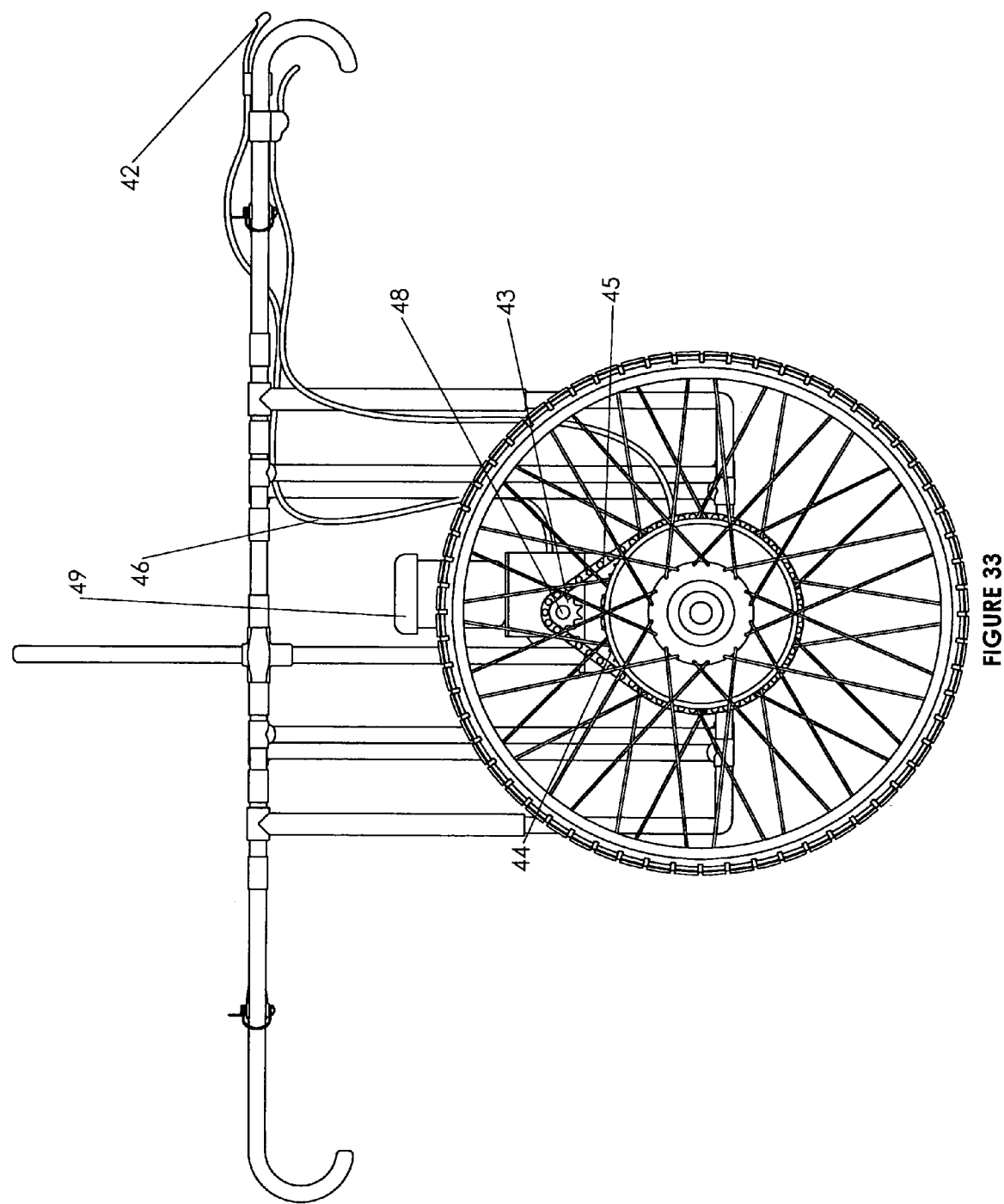
FIG. 33 is a side view of the motorized embodiment of the cart of the present invention.

FIG. 32 is a bottom view of the motorized embodiment of the cart of the present invention. The speed control lever (not shown) is attached to a speed control wire 46, which connects to the motor (not shown). The motor is supported by a motor support platform 47, which is situated between the two anchor blocks 6. FIG. 33 is a side view of the motorized embodiment of the cart of the present invention. This figure shows the speed control lever 42, the speed control wire 46, the drive shaft 48, which is directly connected to the motor and which forms part of the drive sprocket 43, the drive chain 45 and the driven wheel sprocket 44. It also shows the battery 49, which provides power to the motor (not shown).

Figure 34:
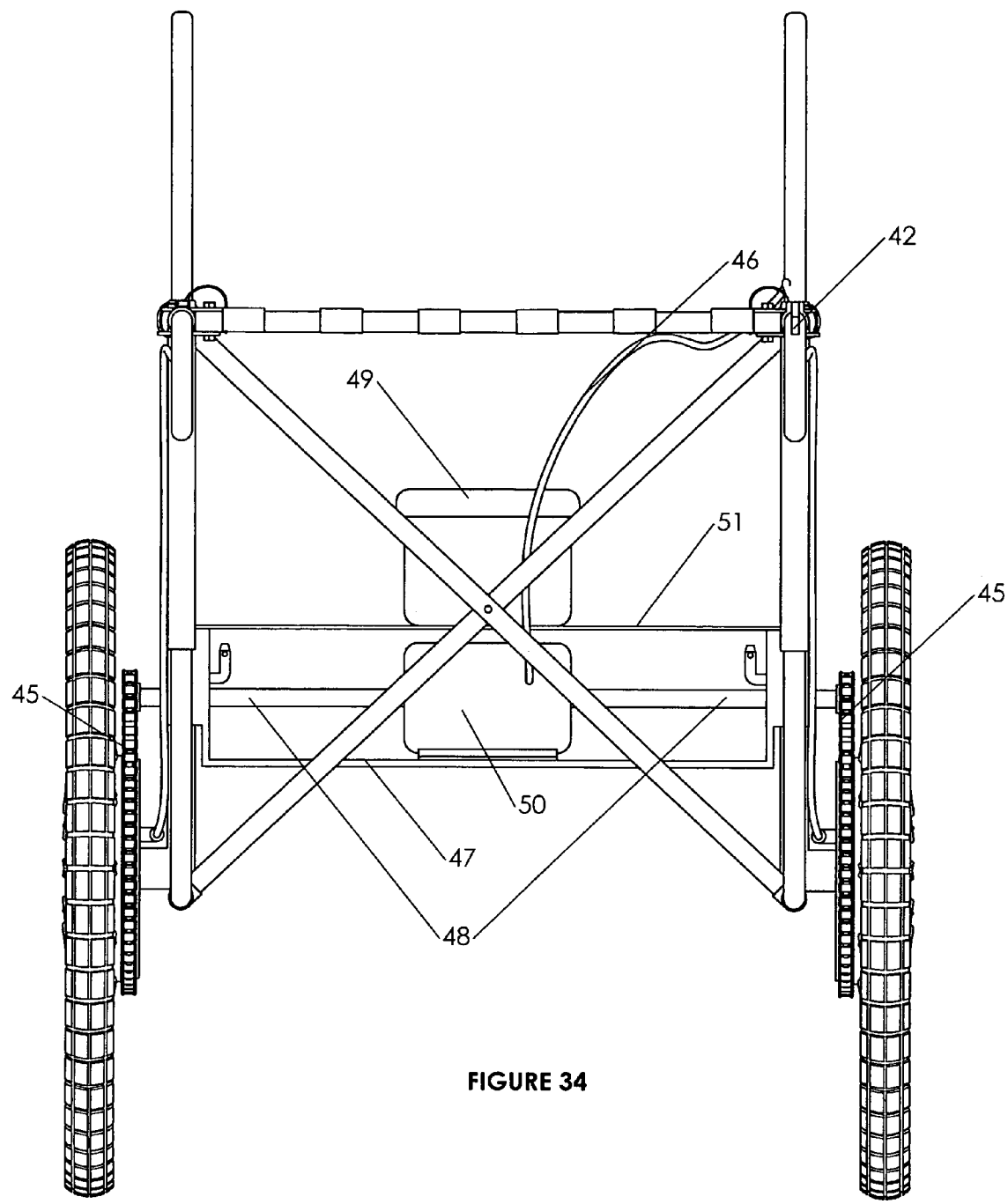
FIG. 34 is a front view of the motorized embodiment of the cart of the present invention.
Figure 35:
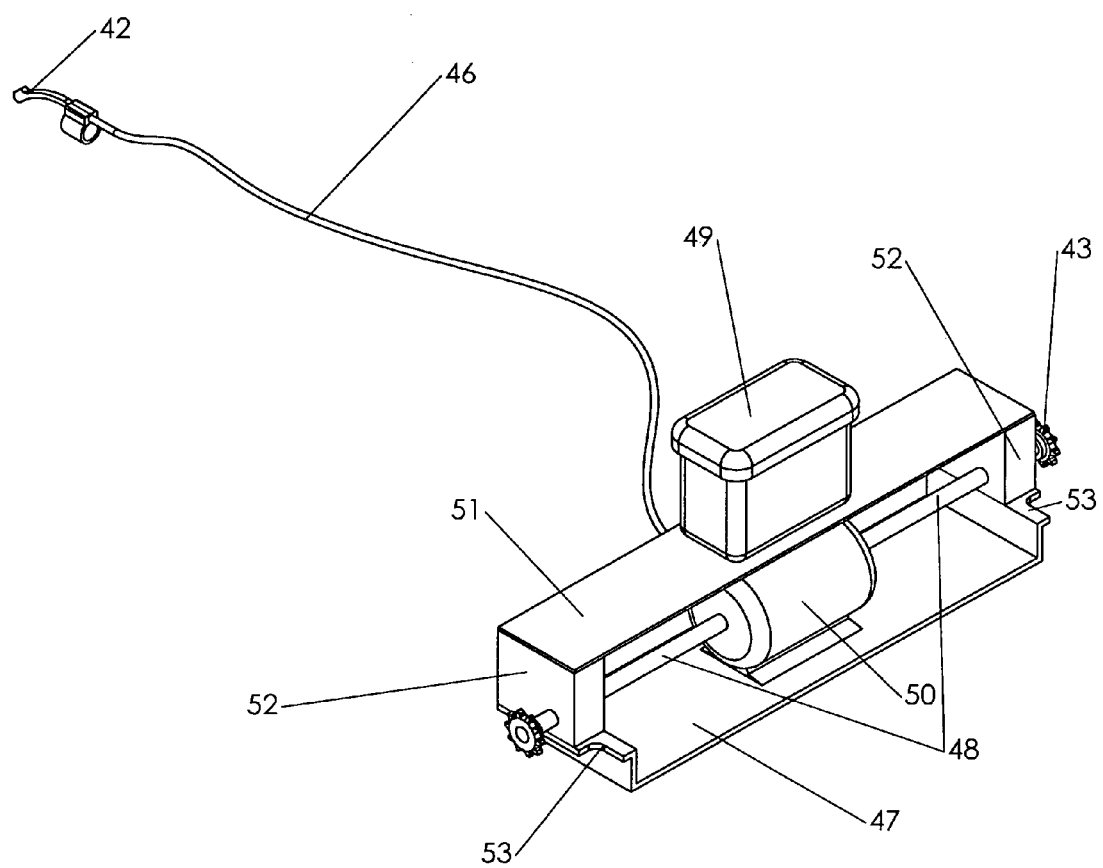
FIG. 35 is a perspective view of the motor component of the motorized embodiment of the cart of the present invention.

FIG. 34 is a front view of the motorized embodiment of the cart of the present invention. This figure shows the motor 50, the motor support platform 47, the battery 49 and the battery support platform 51, the speed control lever 42, the speed control wire 46, the drive shaft 48, and the drive chains 45. FIG. 35 is a perspective view of the motor component of the motorized embodiment of the cart of the present invention. This figure shows the motor 50, motor support platform 47, battery 49 and battery support platform 51, the drive shaft 48, the drive sprockets 43, the speed control wire 46 and the speed control lever 42. It also shows two support blocks 43, which serve to separate the motor support platform 47 from the battery support platform 51 and which provide structural support to the battery support platform 51. The motor support platform 47 comprises a ledge 53 on either side. When the motor is installed on the cart, the ledge rests on top of the anchor block (not shown).

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A collapsible cart comprising:
   (a) two elongate handle bars;
   (b) four vertical telescoping bars;
   (c) two main vertical supports;
   (d) two horizontal cross-bars;
   (e) two anchor blocks;
   (f) four diagonal pivoting support bars; and
   (g) two wheel assemblies;
   wherein each vertical telescoping bar is fixedly attached at one end of the vertical telescoping bar to one of the horizontal cross-bars and at the other end of the vertical telescoping bar to one of the elongate handle bars, and wherein the vertical telescoping bars rotate at the point at which they attach to the elongate handle bars;
   wherein each main vertical support is attached at one end of the main vertical support to one of the anchor blocks, and wherein each elongate handle bar slides up and down on one of the main vertical supports;
   wherein each horizontal cross-bar is attached at one end of the horizontal cross-bar to one of the four vertical telescoping bars and at the other end of the horizontal cross-bar to another of the four vertical telescoping bars; and
   wherein each diagonal pivoting support bar is attached at one end of the diagonal pivoting support bar to the horizontal cross-bar on one side of the cart and at the other end of the diagonal pivoting support bar to the elongate handle bar on the other side of the cart, and wherein the diagonal pivoting support bars rotate at the points at which they attach to the horizontal cross-bars and elongate handle bars.

2. The collapsible cart of claim 1, wherein each anchor block is support by one of the two horizontal cross-bars.

3. The collapsible cart of claim 1, wherein the four diagonal pivoting support bars are attached to each other in pairs at a pivot point so that each pair of diagonal pivoting support bars form an "X."

4. The collapsible cart of claim 1, further comprising two handle support arms, wherein the handle support arms are removable, and wherein each handle support arm connects one of the elongate handle bars to the other.

5. The collapsible cart of claim 4, further comprising a tongue, a brace and a locking bracket, wherein the tongue comprises two lateral wings, two transport arms, and a trailer hitch, wherein each vertical telescoping bar comprises an upper portion and a lower portion, where each lateral wing of the tongue is attached to the lower portion of one of the vertical telescoping bars, and wherein the brace is attached to the tongue on one end and secured to one of the handle support arms on the other end.

6. The collapsible cart of claim 1, further comprising a carrying platform, wherein the carrying platform is attached to the elongate handle bars when the cart is in a collapsed position and to the elongate handle bars and the handle support bars when the cart is in a non-collapsed position, and wherein the carrying platform is comprised of a flexible material.

7. The collapsible cart of claim 6, wherein the flexible material is nylon webbing.

8. The collapsible cart of claim 1, further comprising a main horizontal connector, wherein the main horizontal connector is removable, and wherein the main horizontal connector is attached at one end to one of the anchor blocks and at the other end to the other anchor block.

9. The collapsible cart of claim 1, further comprising a manual brake.

10. The collapsible cart of claim 9, wherein each wheel assembly comprises a wheel, an axle and a brake drum.

11. The collapsible cart of claim 10, wherein the wheels are motorcycle wheels.

12. The collapsible cart of claim 1, further comprising a tongue, a receiver, a loading bar, and a corner piece, wherein the receiver is attached to a vehicle, wherein the tongue is attached to the receiver, wherein the tongue comprises a transport sleeve, wherein the loading bar slides through the transport sleeve, wherein the tongue comprises transport arms, wherein the transport arms hold the cart when it is in a collapsed position, wherein the loading bar comprises a front end, and wherein the corner piece attaches to the front end of the loading bar.

13. The collapsible cart of claim 12, wherein the corner piece secures the cart in place for transport.

14. The collapsible cart of claim 12, wherein the transport arms comprise transport safety tabs, and wherein the transport safety tabs keep the cart from falling off when it is loaded onto the transport arms.

15. The collapsible cart of claim 12, further comprising a hoist mechanism, wherein the hoist mechanism comprises a horizontal bar, two chains, and a pulley system, wherein the corner piece comprises an eyelet, wherein the pulley system is attached to the eyelet, wherein the loading bar is pushed upward through the transport sleeve and locked in place, wherein each chain is secured to one end of the elongate handle bars, wherein the pulley system comprises a rope, and wherein the cart is lifted off the transport arms by pulling on the rope.

16. The collapsible cart of claim 15, wherein the cart is lowered to the ground by letting up on the rope.

17. The collapsible cart of claim 1, further comprising a motor drive assembly, wherein the motor drive assembly comprises a motor, a battery, a drive shaft, two drive sprockets, two driven wheel sprockets, and two drive chains, wherein the motor drives the drive shaft, wherein the drive shaft turns the drive sprockets, wherein the drive sprockets drive the drive chains, wherein the drive chains drive the driven wheel sprockets, and wherein the driven wheel sprockets cause the wheels to turn.

18. The collapsible cart of claim 17, wherein the motor drive assembly further comprises a motor support platform, wherein the motor is supported by the motor support platform, and wherein the motor support platform is supported by the anchor blocks.

19. The collapsible cart of claim 18, wherein the motor drive assembly further comprises a battery support platform and two support blocks, wherein the battery is supported by the battery support platform, wherein the battery support platform is supported by the support blocks, and wherein the support blocks are situated between the motor support platform and the battery support platform.

20. The collapsible cart of claim 17, further comprising a speed control lever and a speed control wire, wherein the speed control lever is attached to one of the elongate handle bars, and wherein the speed control wire connects the speed control lever to the motor.

* * * * *